US011898746B2

(12) United States Patent
Thiessen et al.

(10) Patent No.: US 11,898,746 B2
(45) Date of Patent: Feb. 13, 2024

(54) BURNER TUBE

(71) Applicants: Randall J. Thiessen, Toledo, IA (US); LaVoy M. Thiessen, Jr., Parker, CO (US)

(72) Inventors: Randall J. Thiessen, Toledo, IA (US); LaVoy M. Thiessen, Jr., Parker, CO (US)

(*) Notice: Subject to any disclaimer, the term of this patent is extended or adjusted under 35 U.S.C. 154(b) by 236 days.

(21) Appl. No.: 17/310,532

(22) PCT Filed: Nov. 2, 2020

(86) PCT No.: PCT/US2020/058486
§ 371 (c)(1),
(2) Date: Aug. 9, 2021

(87) PCT Pub. No.: WO2021/091812
PCT Pub. Date: May 14, 2021

(65) Prior Publication Data
US 2022/0090781 A1 Mar. 24, 2022

Related U.S. Application Data

(60) Provisional application No. 62/930,348, filed on Nov. 4, 2019.

(51) Int. Cl.
*F23C 3/00* (2006.01)
*F23C 7/00* (2006.01)
(Continued)

(52) U.S. Cl.
CPC .............. *F23C 7/006* (2013.01); *F23C 3/002* (2013.01); *F23D 14/02* (2013.01); *F23D 14/62* (2013.01);
(Continued)

(58) Field of Classification Search
CPC ...................... F23C 7/006; F23C 3/002; F23C 2900/99011; F23D 14/02; F23D 14/62; F23G 5/0276; F23G 2201/40
(Continued)

(56) References Cited

U.S. PATENT DOCUMENTS

| 848,564 | A | * | 3/1907 | Mitchell | ................. | F22B 21/26 |
| | | | | | | 122/248 |
| 3,663,153 | A | * | 5/1972 | Bagge | ..................... | F23D 14/22 |
| | | | | | | 431/351 |

(Continued)

FOREIGN PATENT DOCUMENTS

| WO | 2019057166 A1 | 3/2019 |
| WO | 2021091812 A1 | 5/2021 |

OTHER PUBLICATIONS

International Searching Authority in connection with PCT/US2020/058486 filed Nov. 2, 2020, "The International Search Report and the Written Opinion of the International Searching Authority, or the Declaration", 14 pages, dated Feb. 3, 2021.

*Primary Examiner* — Avinash A Savani
(74) *Attorney, Agent, or Firm* — McKee, Voorhees & Sease, PLC

(57) ABSTRACT

A system and method uses a combustor and gasifier to burn a primary dirty fuel, such as waste materials or high-polluting fossil fuels, and a secondary low-polluting fuel, such as biomass fuels, for co-generation of electricity while reducing harmful emissions. The primary fuel is burned at least partially through the use of an improved burner tube. Dirty exhaust from a combustor is scrubbed by a gasifier by reforming the combustors exhaust gases into a clean-burning producer gas (syn-gas). The secondary fuel and oxygen are added to the dirty exhaust in the gaslifier to create gas, char and ash. The gas powers an engine or turbine that turns a (Continued)

generator, or a boiler, Stirling engine, or Organic Rankine Cycle power plant, and releases a cleaner exhaust.

20 Claims, 17 Drawing Sheets

(51) Int. Cl.
  *F23D 14/02* (2006.01)
  *F23D 14/62* (2006.01)
  *F23G 5/027* (2006.01)
(52) U.S. Cl.
  CPC .. *F23G 5/0276* (2013.01); *F23C 2900/99011* (2013.01); *F23G 2201/40* (2013.01)
(58) Field of Classification Search
  USPC .............................................................. 431/8
  See application file for complete search history.

(56) References Cited

U.S. PATENT DOCUMENTS

| | | | |
|---|---|---|---|
| 3,867,092 A | 2/1975 | Sage et al. | |
| 4,630,554 A * | 12/1986 | Sayler | F23K 3/02 |
| | | | 110/104 B |
| 4,690,338 A * | 9/1987 | Sayler | F23K 1/00 |
| | | | 241/162 |
| 6,336,449 B1 | 1/2002 | Drisdelle et al. | |
| 6,637,206 B2 | 10/2003 | Thiessen | |
| 8,961,626 B1 | 2/2015 | Thiessen et al. | |
| 2003/0136127 A1* | 7/2003 | Thiessen | F23G 7/10 |
| | | | 60/670 |
| 2005/0100848 A1 | 5/2005 | Meister et al. | |
| 2008/0081304 A1 | 4/2008 | Poe et al. | |
| 2008/0178860 A1* | 7/2008 | Schwank | F23D 91/02 |
| | | | 126/91 A |
| 2009/0253088 A1* | 10/2009 | Huau | F23G 7/05 |
| | | | 431/278 |
| 2010/0218501 A1 | 9/2010 | York et al. | |
| 2017/0349847 A1 | 12/2017 | Thiessen et al. | |

* cited by examiner

BURNER TUBE

CROSS REFERENCE TO RELATED APPLICATIONS

This is a U.S. National Phase application claiming priority to PCT/US20/58486, filed Nov. 2, 2020 which claims benefit of provisional patent application, U.S. Ser. No. 62/930,348, filed Nov. 4, 2019. The provisional patent application is herein incorporated by reference in its entirety, including without limitation, the specification, claims, and abstract, as well as any figures, tables, appendices, or drawings thereof.

FIELD OF THE INVENTION

The present invention relates generally to an improved combined combustor and gasifier which cleanses emissions and provides co-generation of power from the burning of waste materials or low-grade coals. More particularly, though not exclusively, the present invention relates to an improved burner tube for use in the combined combustor and gasifier.

BACKGROUND OF THE INVENTION

The background description provided herein gives context for the present disclosure. Work of the presently named inventors, as well as aspects of the description that may not otherwise qualify as prior art at the time of filing, are neither expressly nor impliedly admitted as prior art.

Currently, there are many types of combined steam boiler/combustor and gasifier systems known in the art. Some of these gasification systems use the gasification process as the primary energy generation means. These gasification systems generally take materials, such as wood, coal, charcoal, agricultural residues, energy crops, municipal solid waste or other biomass materials, and gasify them to make a "producer gas" (sometimes referred to as "syngas") used for power or electricity generation. A typical gasification system consists of a gasifier unit, filtering system, and an energy converter.

Steam boiler/combustor units are well-known, though their use as primary energy generation has been questionable for some time, mainly because of the harmful resultant emissions. A steam boiler/combustor creates high pressure steam used for power generation, process steam, or heating. Prior art systems apply steam boiler/combustor units as secondary energy generation means to gain energy and thus increased efficiency from the gases and char produced during the gasification process.

For example, U.S. Pat. No. 5,937,652 to Adelmalek, uses the gasifier as the primary energy converter. Adelmalek shows a gasifier that converts biomass fuel into a producer gas and char. The producer gas, generally a mixture of carbon monoxide, hydrogen and hydrocarbon, is then sent into a boiler and burned with the char to produce the high pressure steam needed to power a steam generator. Carbon dioxide is re-circulated into the gasifier. However, the flue gas from the boiler, containing other potentially harmful emissions, is allowed to escape into the atmosphere.

Similarly, in U.S. Pat. No. 5,626,638 to Valkanas, the gasification process is the primary means for energy conversion. Only the gases from the gasifier are used to power a gas turbine and to feed a steam generator. The flue gases from the steam generator are potentially harmful and yet are allowed to escape into the atmosphere.

Boilers used in prior art systems use carbonaceous fuels, typically, accepting the gases from the gasifier, for steam generation. However, there are currently certain fossil fuels and many types of waste material, such as shingles and used tires, that have fuel potential but are not used because of the high amounts of pollutants created during the combustion process. These are dirty fuels. For example, a typical used tire when burned directly creates an array of toxic byproducts such as dioxins, furans, PAHs, PCBs, hexavalent chromium, and cadmium. Other toxic byproducts from tire burning include mercury, lead, nickel, beryllium, xylene, toluene, phenol, mono-chlorobenzene, napthalene, formaldehyde and acetaldehyde. Similar observations can be made for bituminous coal. It is therefore preferable to gasify the tire and burn the gas which is much easier to control and clean. In the case of solid waste, if these waste materials are not used, they typically wind up in city dumps or landfills. Putting these waste materials to use for energy production would significantly reduce the size of landfills.

U.S. Pat. No. 6,637,206 to Thiessen, herein incorporated by reference in its entirety, improved on the art by employing a combustor as the primary energy converter. Doing so provided a system and method able to obtain useful power from biomass and other materials while minimizing the harmful emissions from the boiler by taking advantage of the unique characteristics of a biomass gasifier. However, said method and apparatus were far from perfect, and thus there was a need in the art to optimize the efficiency of the same.

U.S. Pat. No. 8,961,626 to Thiessen, herein incorporated by reference in its entirety, further optimized the aforementioned system and method by including a rotating and movable bed within the gasifier to facilitate the control of fuel flow and burn rate. In other words, U.S. Pat. No. 8,961,626 to Thiessen optimized the aforementioned system and method by improving the design of the gasifier.

Thus, there is room for improving known combinations of combustors and gasifiers by advancing the state of the art in components of the system other than the gasifier.

SUMMARY OF THE INVENTION

The following objects, features, advantages, aspects, and/or embodiments, are not exhaustive and do not limit the overall disclosure. No single embodiment need provide each and every object, feature, or advantage. Any of the objects, features, advantages, aspects, and/or embodiments disclosed herein can be integrated with one another, either in full or in part.

It is a primary object, feature, and/or advantage of the present invention to improve on or overcome the deficiencies in the art.

It is still yet a further object, feature, and/or advantage of the present invention to provide a system which efficiently burns dirty fuels such as waste materials or low-grade coal.

It is still yet a further object, feature, and/or advantage of the present invention to provide a system capable of burning two different types of fuel. Preferably, the primary fuel is a high-energy/high-polluting fuel used to generate most of the energy from the system, and the secondary fuel is a relatively low-energy/low-polluting fuel.

It is still yet a further object, feature, and/or advantage of the present invention to provide a system which further minimizes harmful emissions. For example, biochar produced by gasifying biomass in a downdraft gasifier, or biochar produced separately in an updraft gasifier, can serve as a "scrubbing" agent for harmful emissions.

It is still yet a further object, feature, and/or advantage of the present invention to provide a system which can recycle high-carbon char and thereby reduce the amount of ash produced in the process.

It is still yet a further object, feature, and/or advantage of the present invention to provide a system which operates similar to a Bunsen burner. The system should be able to pre-mix air with fuel before combustion, in lieu of the typical natural gas burner on a boiler (or a stovetop gas burner or a campfire) which combust gases immediately upon contact with air. In this way, a natural gas burner that produces the same amount of heat from combustion as the burner described herein would be much smaller but require the same amount of air at the flame for proper combustion.

It is still yet a further object, feature, and/or advantage of the present invention to provide a system that can generate power from both the combustor and the gasifier.

It is still yet a further object, feature, and/or advantage of the present invention to provide a system where the combustor is the primary energy conversion means.

It is still yet a further object, feature, and/or advantage of the present invention to provide a system which is safe to operate, cost effective, and durable.

It is still yet a further object, feature, and/or advantage of the present invention to provide a system which is easily used and reused.

It is still yet a further object, feature, and/or advantage of the present invention to provide a system that is easily manufactured, assembled or installed, disassembled or uninstalled, repaired, and cleaned.

It is still yet a further object, feature, and/or advantage of the present invention to improve the system by incorporating individual components into the system which accomplish some or all of the previously stated objectives.

It is still yet a further object, feature, and/or advantage of the present invention to practice methods of using, manufacturing, installing, and repairing components of the system which accomplish some or all of the previously stated objectives.

These and/or other objects, features, advantages, aspects, and/or embodiments will become apparent to those skilled in the art after reviewing the following brief and detailed descriptions of the drawings. Furthermore, the present disclosure encompasses aspects and/or embodiments not expressly disclosed but which can be understood from a reading of the present disclosure, including at least: (a) combinations of disclosed aspects and/or embodiments and/or (b) reasonable modifications not shown or described.

BRIEF DESCRIPTION OF THE DRAWINGS

Several embodiments in which the present invention can be practiced are illustrated and described in detail, wherein like reference characters represent like components throughout the several views. The drawings are presented for exemplary purposes and may not be to scale unless otherwise indicated.

FIG. 21 shows a titanium ring at the bottom of a ceramic/refractory firetube, which enhances gasification when (preferably a 2"-thick) refractory is used in the gasifier, according to some aspects of the present disclosure.

Figure 1:
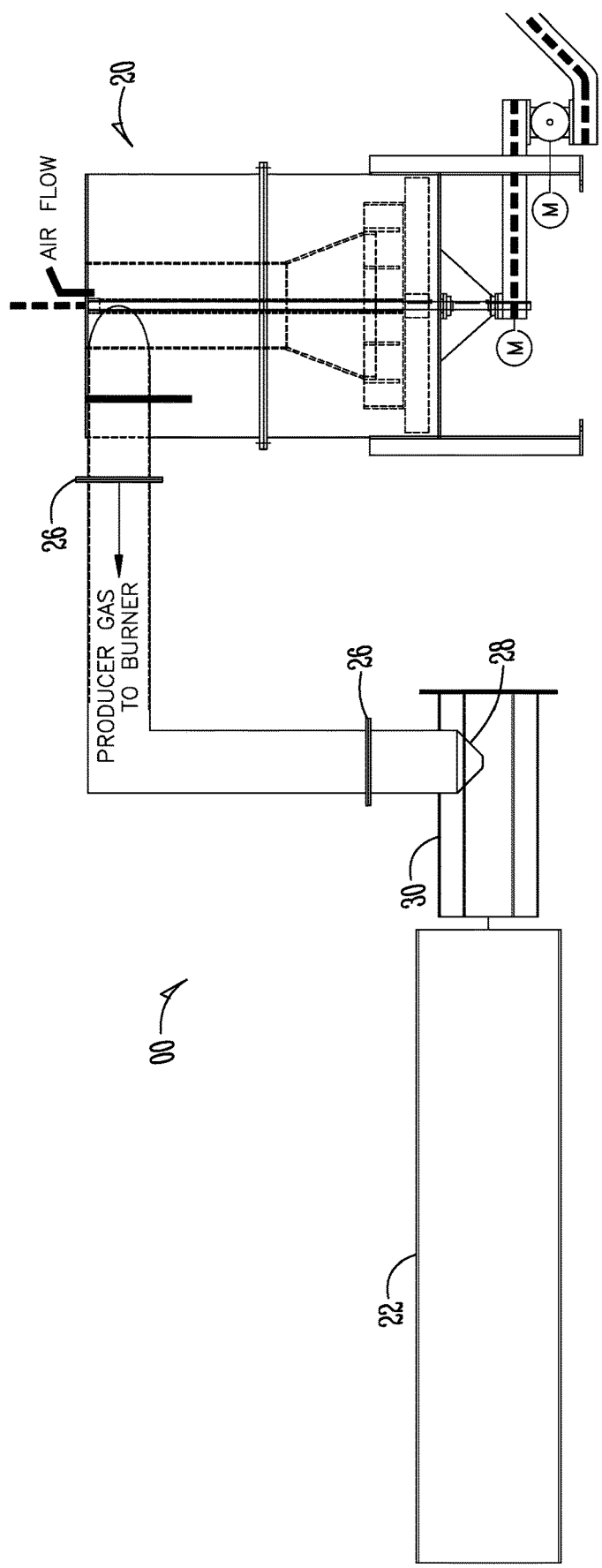
FIG. 1 shows a system view of a combustor and gasifier combination which utilizes an improved burner tube, according to some aspects of the present disclosure.

Several embodiments in which the present invention may be practiced are illustrated and described in detail, wherein like reference numerals represent like components throughout the several views. The drawings are presented for exemplary purposes and may not be to scale, unless otherwise indicated, and thus proportions of features in the drawings shall not be construed as evidence of actual proportions.

DETAILED DESCRIPTION OF THE INVENTION

The present disclosure is not to be limited to that described herein. Mechanical, electrical, chemical, procedural, and/or other changes can be made without departing from the spirit and scope of the present invention. No features shown or described are essential to permit basic operation of the present invention unless otherwise indicated.

Referring now to the figures, FIG. 1 shows a system 00 for burning dirty fuel to produce electricity. The system 00 preferably includes at least a gasifier 20, a combustion tube 22, a syn-gas tube 24, and a burner 30.

Gasification (sometimes called partial combustions) is a process that converts organic- or fossil fuel-based carbonaceous materials into carbon monoxide, hydrogen and carbon dioxide. This is achieved by reacting the material at high temperatures (>700° C.), without combustion, with a controlled amount of oxygen and/or steam. The resulting gas mixture is producer gas (syn-gas). The gas mixture is a fuel. After at least partial combustion, the producer gas can then be modified by simultaneous injection of water or steam to maintain a constant temperature and obtain a higher heat content gas by enrichment of air gas with hydrogen. The power derived from gasification and combustion of the resultant gas is considered to be a source of renewable energy if the gasified compounds were obtained from biomass.

The advantage of gasification is that using producer gas is more efficient than direct combustion of the original fuel because it can be combusted at higher temperatures. As a result, the thermodynamic upper limit to the efficiency defined by Carnot's theorem is higher. Producer gas may be burned directly in gas engines, used to produce methanol and hydrogen, or converted via the Fischer-Tropsch process into synthetic fuel. Gasification can also begin with material which would otherwise have been disposed of such as biodegradable waste. In addition, the high-temperature process refines out corrosive ash elements such as chloride and potassium, allowing clean gas production from otherwise problematic fuels. Additionally, valuable minerals in the ash can be separated out.

The gasifier 20 can be fed with and adapted to burn dirty fuels such as untreated or processed tires, shingles, landfill or waste materials, bituminous coal (also know as low-grade, #2 or high sulfur content coal), other low quality carbonaceous fuels, or the like. Dirty fuels typically have a relatively high energy content. Burning the dirty fuels in the gasifier 20 produces heat and a relatively high amount of pollutants.

In the gasifier 20, the carbonaceous material may undergo several different processes. For example, a dehydration or drying process may occur at around 100° C. Typically the resulting steam is mixed into the gas flow and may be involved with subsequent chemical reactions, notably the water-gas reaction if the temperature is sufficiently high.

A pyrolysis (or devolatilization) process occurs at around 200-300° C. Volatiles are released and char is produced, resulting in up to 70% weight loss for coal. The process is dependent on the properties of the carbonaceous material and determines the structure and composition of the char, which will then undergo gasification reactions.

A combustion process occurs as the volatile products and some of the char react with oxygen to primarily form carbon dioxide and small amounts of carbon monoxide, which provides heat for the subsequent gasification reactions. For example, a basic reaction of the combustion process is $C+O_2 \rightarrow CO_2$, wherein C represents a carbon-containing organic compound.

A gasification process occurs as the char reacts with steam and carbon dioxide to produce carbon monoxide and hydrogen, via the reactions $C+H_2O \rightarrow H_2+CO$ and $C+CO_2 \rightarrow 2CO$.

In addition, the reversible gas phase water-gas shift reaction reaches equilibrium very fast at the temperatures in a gasifier. This balances the concentrations of carbon monoxide, steam, carbon dioxide and hydrogen. $CO+H_2O \leftrightarrow CO_2+H_2$.

In essence, a limited amount of oxygen or air is introduced into the reactor to allow some of the organic material to be burned to produce carbon dioxide and energy, which drives a second reaction that converts further organic material to hydrogen and additional carbon dioxide. Specific exemplary embodiments of the gasifier 20 are shown in FIGS. 12-19 and are discussed in more detail with reference to the same in a later section of the present disclosure.

In the system 00 shown in FIG. 1, the combustion tube 22 is the primary source for energy conversion. The combustion tube 22 is able to contain and maintain stable combustion despite very high air flow rates. To do so, the combustion tube 22 is configured to first mix and ignite the air and fuel in a similar fashion to that of a Bunsen burner. The combustion tube 22 then mixes in more air to complete the combustion process. The combustion tube 22 shown utilizes a single cylindrical chamber to allow for combustion of the fuel and thereby provide heat. Yet, the present disclosure is not meant to be limited to such a design, as more complex designs for the combustion tube 22 are still consistent with the objects, features, or advantages of the present invention.

The gasifier 20 or multiple gasifiers 20 are fluidly connected to the combustion tube 22 through at least one syn-gas tube 24. The syn-gas tube 24 provides syn-gas to the combustion tube 22. In a preferred embodiment, the syn-gas tube 24 is cylindrical in nature and comprises a top portion or member, a middle portion or member, and a bottom portion or member. Each portion or member may be coupled to one another with a heavy-duty band clamp 26, such as an air tight Marman clamp. The top portion or member can be permanently fixed or removably secured to an upper part of the gasifier 20 near an inlet of the syn-gas tube or at least one port of the gasifier 20. The bottom portion or member can be permanently fixed or removably secured to an upper part of the burner 30 near an outlet 28 of the syn-gas tube. The outlet 28 of the syn-gas tube also serves an inlet for at least a part of the burner 30. As shown, the middle portion or member can redirect the flow of producer gas approximately ninety degrees from such that the producer gas can enter the burner 30 from directly above the burner 30. In other embodiments (not shown), the syn-gas tube 24 comprises a single steel tube connecting the gasifier 20 to the burner 30.

At a high-level, the burner 30 can be described as a device that allows for ignition and combustion by, at least in part, mixing a fuel gas with an oxidizer such as ambient air to produce a controlled flame. The controlled flame is generally used for the production of heat. The burner 30 is operatively connected to the combustion tube 22. In some embodiments, the burner 30 and combustion tube 22 are overlapping. In other words, the burner 30 is located inside of the combustion tube 22, similar to how a Marine boiler utilizes a Morrison tube. In other configurations, the burner 30 and the combustion tube are sealably connected to one another near or at the point of ignition. The sealed connection can be air tight or can comprise an open gap(s) to allow additional ambient air to mix with the syn-gas just before ignition.

Figure 2:
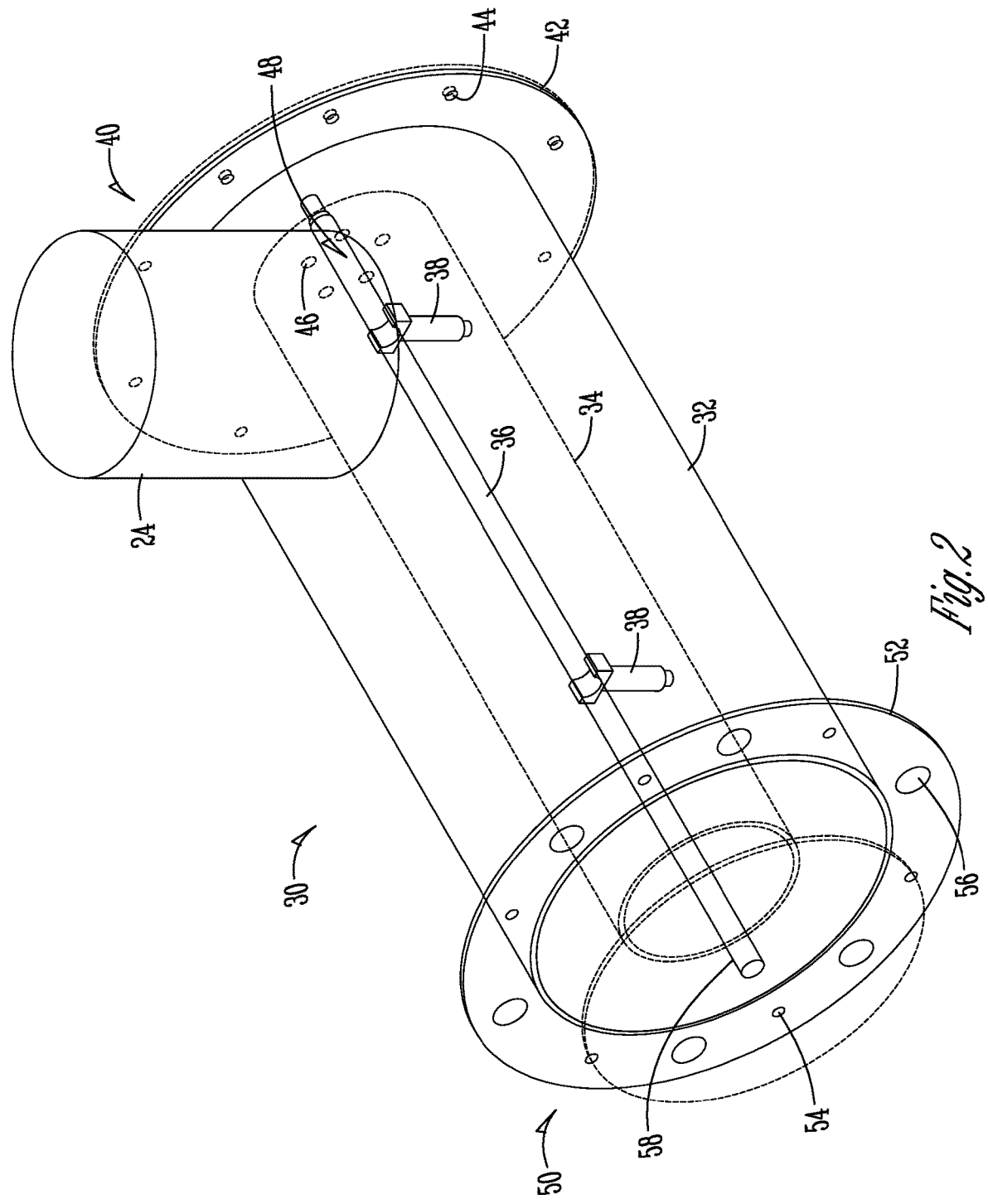
FIG. 2 shows an assembled view of the burner tube, according to some aspects of the present disclosure.

FIG. 2 illustrates several additional aspects of the burner 30. The burner 30 notably includes a burner tube 32, an air intake tube 34, and an adjustment rod 36. All welds shown in or described with respect to FIG. 2 are air tight unless otherwise noted.

The burner tube 32, air intake tube 34, and adjustment rod 36 typically comprises a cylindrical body, however, each or any one of these components may take on any known three-dimensional shape. For example, the shape of the each or any one of these components may be selected from the group consisting of cylinders, ellipsoids (including spheres), partial ellipsoids (including hemispheres), regular polyhedrons (including pyramids, cubes, etc.), irregular polyhedrons, cones, surfaces of revolution (including tori), helixes (e.g., coils and springs), and a combination thereof. Each or any one of these components may be solid (preferable for the adjustment rod 36), partially hollow (preferable for the air intake tube 34), or completely hollow (preferable for the burner tube 32). In a preferred embodiment, the burner tube 32, the air intake tube 34, and the adjustment rod 36 are all concentrically positioned such that each of the components substantially share a common central axial axis.

In the embodiment shown, the burner tube 32 has a first end, a second end, a circumferential outer surface, an inlet 28 for receiving fuel on the circumferential outer surface, and an outlet 58 for dispensing fuel near the second end. The air intake tube 34 is concentrically positioned within the cylindrical body of the burner tube 32. The air intake tube traverses a length of the burner tube 32 from the first end to the second end. In other words, the burner tube 32 and the air intake tube 34 are the same length when mated together. The air intake tube 34 has an inlet for receiving ambient air near the first end of the burner tube 32. The adjustment rod 36 is concentrically positioned within the air intake tube 34. The adjustment rod 36 traverses at least the length of the burner tube 32 from the first end to the second end.

Adjustment rod supports 38 attach to and traversing a radial distance between the air intake tube 34 and the adjustment rod 36. The adjustment rod supports 38 are placed in an upright position such that a load caused by a gravitational force acting on the adjustment rod 36 is allowed to travel through a longitudinal axis of the adjustment rod supports 38.

Mounting plates 40, 50 are included at the first end and the second end of the burner tube 32. The mounting plates 40, 50 each comprise a flange 42, 52 and through holes 44, 54 to facilitate mounting the burner 30 in a fixed position. Inner through holes 46 can be included in the mounting plate 40 at the first end. Air holes 56 can be included in the mounting plate 50 at the second end.

Figure 3:
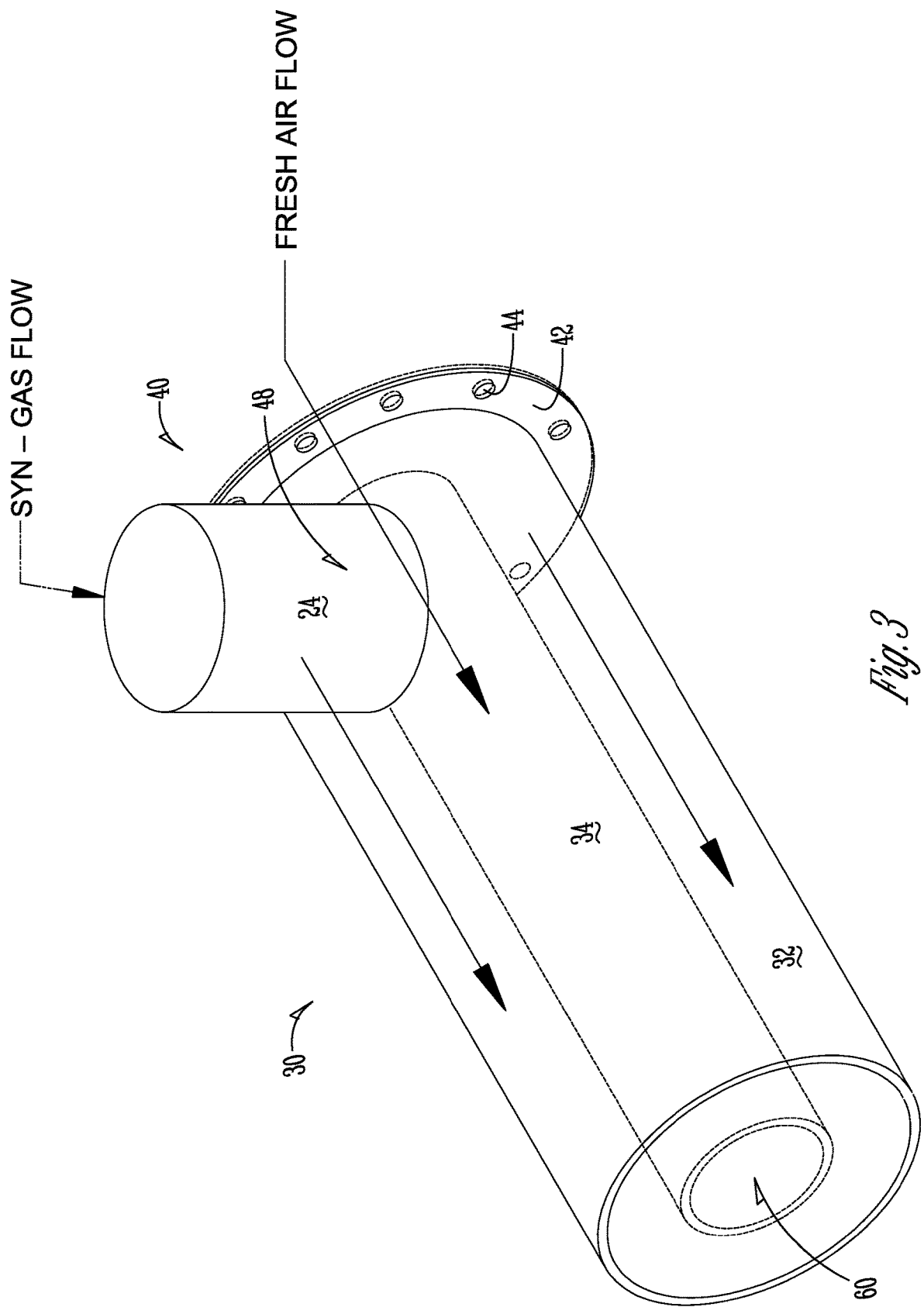
FIG. 3 shows a detailed perspective view emphasizing the direction of gas flow through the burner tube and syn-gas tube, according to some aspects of the present disclosure.

FIG. 3 illustrates several additional aspects of the burner 30, emphasizing both air and fuel flow within the combustion system 00. The burner 30 is burner adapted to receive a gasified biomass fuel (typically selected from a group consisting of organic- and fossil fuel-based carbonaceous materials). from the gasifier 20. The combustion tube 22 is adapted to burn dirty fuels and to receive a mixture of ambient air and a gasified biomass fuel from the burner 30. The syn-gas tube 24 fluidly connects and carries syn-gas from the gasifier 20 to the burner 30. In an alternative embodiment, the positioning of the syn-gas tube 24 and the combustion tube 22 can be reversed. Such a configuration facilitates the use of positive pressure (blown air) instead of negative pressure (sucked air) for gasification.

In other words, fuel is received at the inlet 28 of the burner tube 32. Ambient air is received at an inlet of the air intake tube 34. As the adjustment rod 36 is adjusted and the distance in which the adjustment rod 34 protrudes from the burner tube 32 at one end is changed, mixing of the fuel and the ambient air forms a resulting gas. The resulting gas can be ignited in the burner 30 or in the combustion tube 22 to aid in burning dirty fuels.

Figure 5:
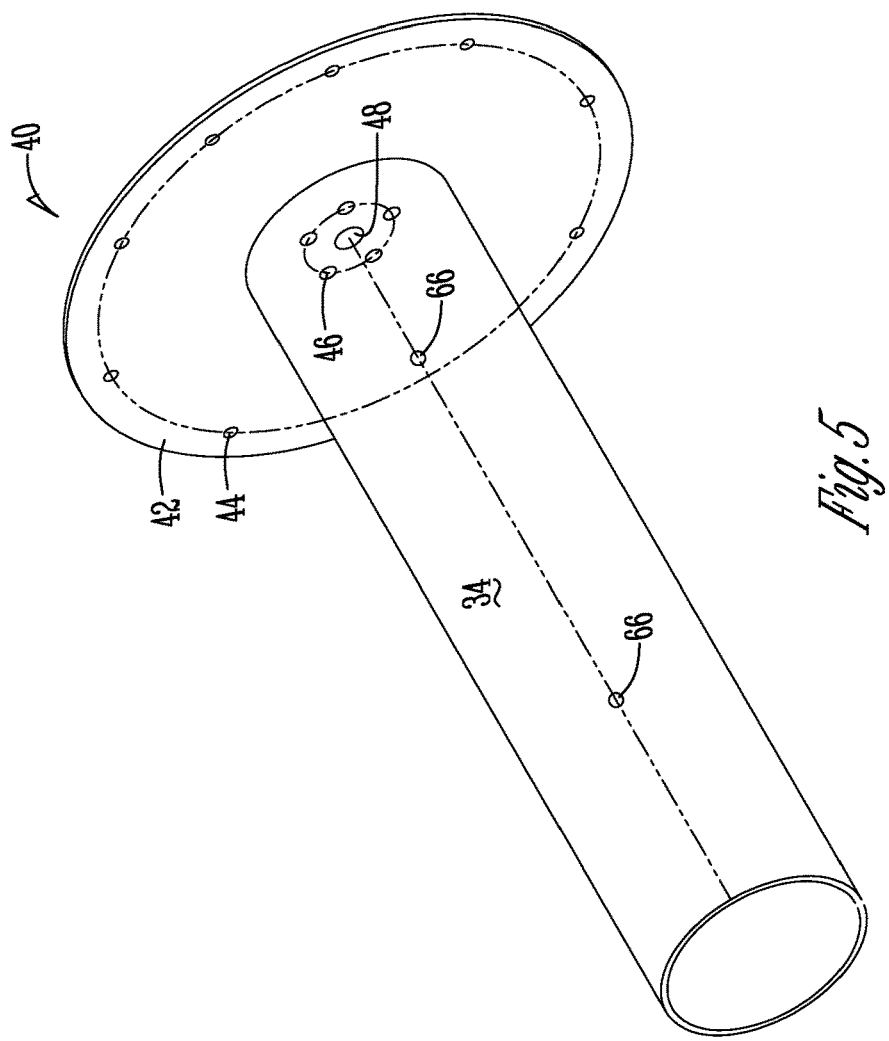
FIG. 5 shows a perspective view of the air intake tube, according to some aspects of the present disclosure.
Figure 4:
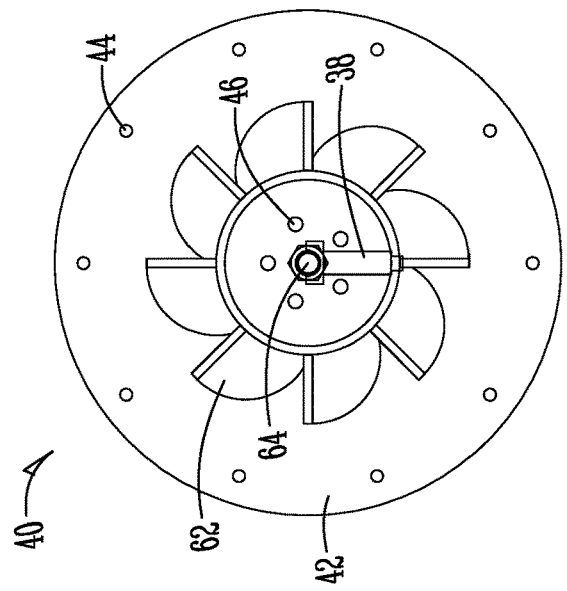
FIG. 4 shows an end elevation view of the air intake tube, according to some aspects of the present disclosure.

FIGS. 4 and 5 illustrate additional aspects of the air intake tube 34 and mounting plate 40. More particularly, the air intake tube 34 includes fins 62 arrayed about a circumferential outer surface of the air intake tube 34 to further facilitate mixing ambient air and fuel. There can be any number of fins 62, however the number of fins 62 does not typically change after initial assembly. In some embodiments, the fins 62 are stationary; in other embodiments, the pitch of the fins 62 is automatically adjustable to change the angle at which the fins 62 are positioned and to effect change in fluid flow through burner tube 32. Weld nuts 64 can further secure the adjustment rod 36 into a secure position.

Additionally, blind holes 66 are provided to facilitate attachment between the adjustment rod supports 38 and the air intake tube 34. A damper system may be used to control the airflow into the burner.

Figure 6:
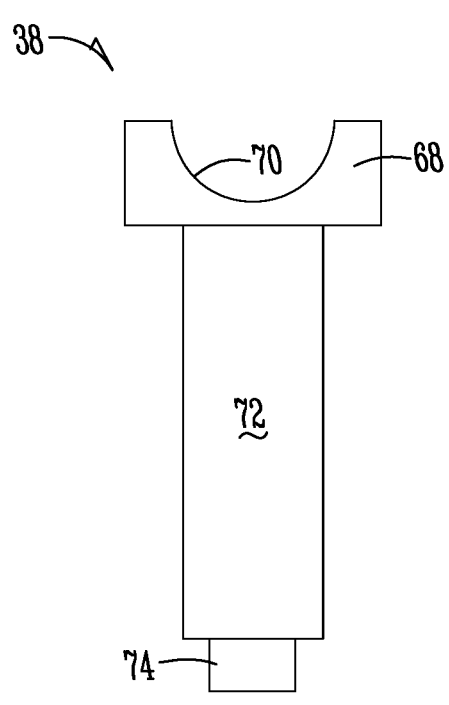
FIG. 6 shows an end elevation view of the adjustment rod support, according to some aspects of the present disclosure.
Figure 7:
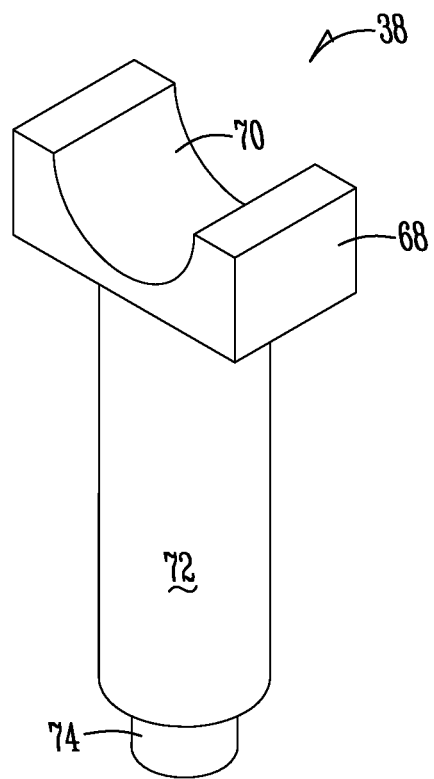
FIG. 7 shows a perspective view of the adjustment rod support, according to some aspects of the present disclosure.

FIGS. 6 and 7 illustrate aspects of an exemplary adjustment rod support 38. In the embodiment shown, the adjustment rod support 38 comprises a support block 68 which resembling part of a pillow block or the lower half of a shaft collar. The support block 68 contains a bearing surface 70, and preferably a curved bearing surface, which matingly engages and thus supports a curved surface of the adjustment rod 36. Also included in the adjustment rod support 38 is a column 72 and a peg 74 extending therefrom. The column 72 is primarily responsible for transferring a load along its axial axis (i.e., an axial load) from the adjustment rod 36 to the air intake tube 34. The magnitude of the load is determined, at least in part, by the weight of the adjustment rod 36, the number and location of the adjustment rod supports 38, and gravity. The peg 74 is typically a short cylindrical piece of metal used to secure the adjustment rod support 38 to the air intake tube 34, such as through blind holes 66.

Figure 8:
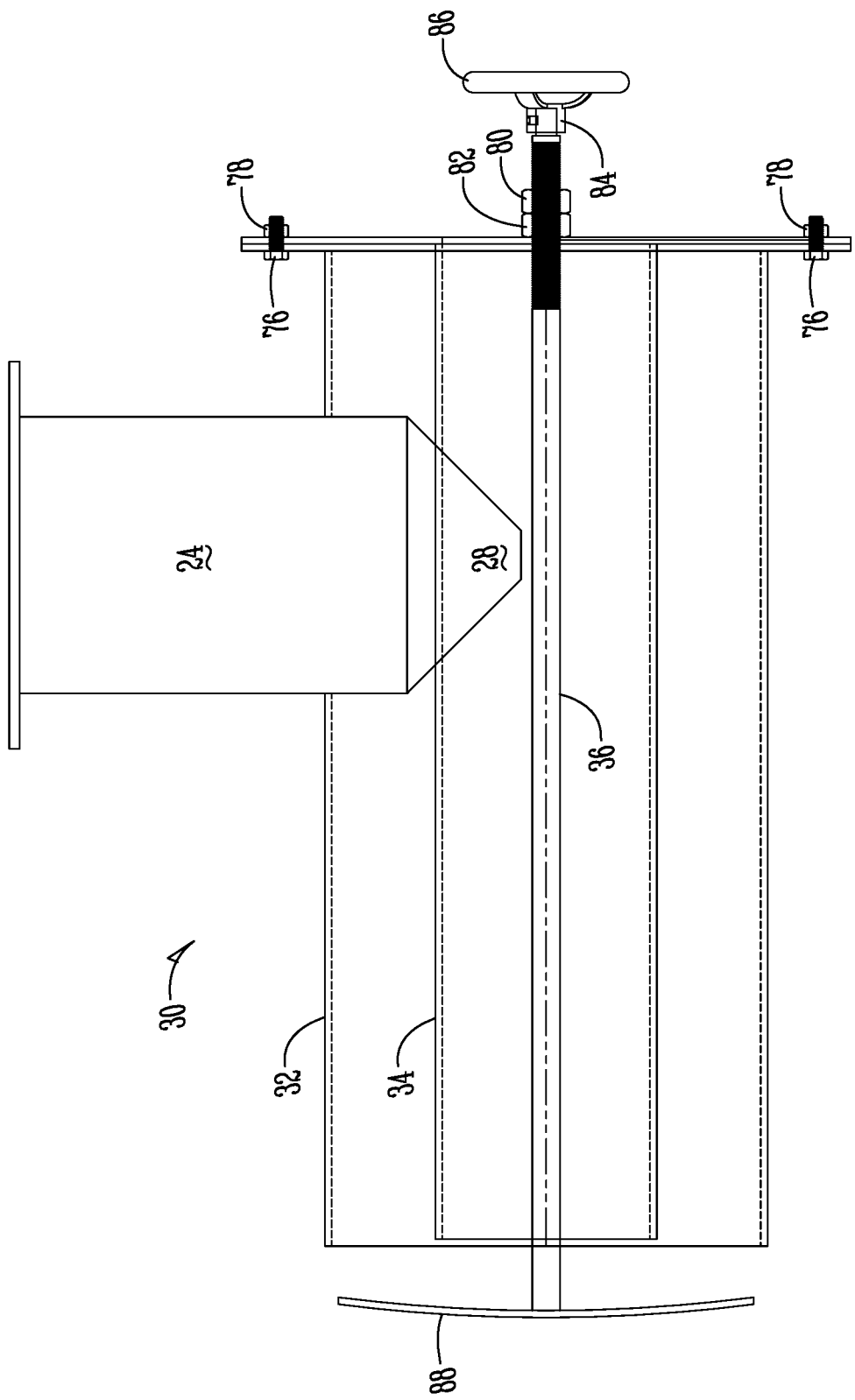
FIG. 8 shows a side section view of the adjustment rod traversing the length of the burner tube, according to some aspects of the present disclosure.

FIG. 8 illustrates additional aspects of the burner tube 32 and mounting plate 40. Male fasteners 76, such as threaded screws and bolts, an alignment post, a mounting boss, a sheet metal tab connector, or the like, can attach to female fasteners 78, such as a threaded nut, an alignment hole, a mounting recess, a sheet metal slot connector, or the like, through outer through holes 44, thereby securing the burner tube 32 to the mounting plate 40.

Figure 9:
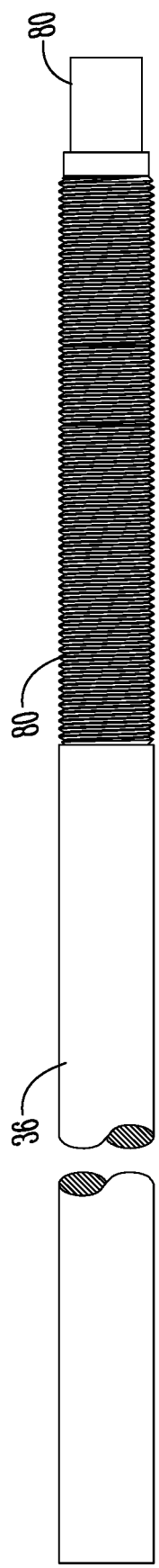
FIG. 9 shows a detailed view of the adjustment rod, according to some aspects of the present disclosure.

FIGS. 8 and 9 illustrate additional aspects of how the adjustment rod 36 attaches to the burner tube 32 and mounting plate 40. For example, the adjustment rod 36 includes threads 80. Namely, the threads 80 threadably engage weld nuts 82 and pass through a center 48 of the mounting plate 40. Rotating the adjustment rod 36 will adjust a position of a mixing plate 88 towards a combustor end of the burner tube 32. In other words, the threads 80 act as a mechanism to vary a distance in which the adjustment rod 36 protrudes from the burner tube 32. The adjustment rod 36 comprises a peg 84 at one end which secures to a handle 86. The handle 86 facilitates rotation of the adjustment rod.

Figure 10:
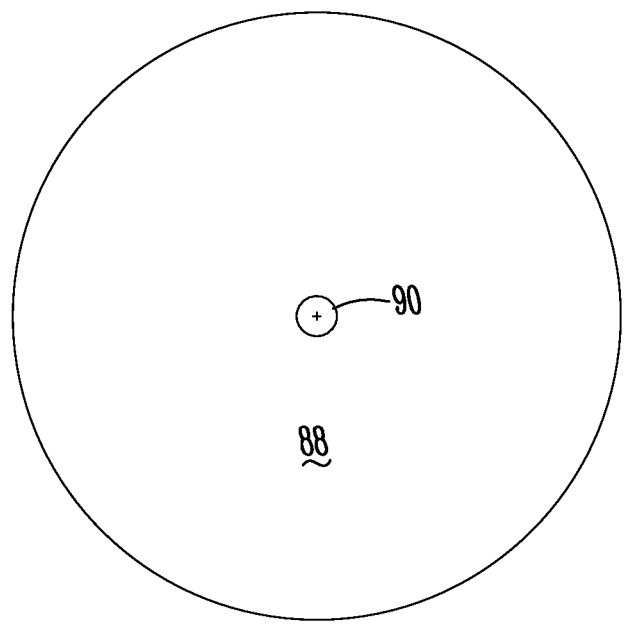
FIG. 10 shows an end elevation view of the mixing plate, according to some aspects of the present disclosure.
Figure 11:
FIG. 11 shows a top elevation view of the mixing plate, according to some aspects of the present disclosure.

FIGS. 10 and 11 illustrate additional aspects of the mixing plate 88. The mixing plate 88 includes a central aperture 90 for mounting the mixing plate to the adjustment rod 36. As shown in FIG. 11, the mixing plate 88 can be concave, i.e., curved toward the burner 30, to cause better mixing of gas and air and better combustion. Alternatively, the mixing plate 88 can be convex, i.e., curved away from the burner 30, to prevent overheating and to resist corrosion after repeated use/long periods of time. Alternatively, a mixing cone (not shown) having fins on its exterior can be used to cause a counter rotation of the incoming air to the rotation of the producer gas at the burner exit, resulting in added mixing of the air and gas.

Figure 12:
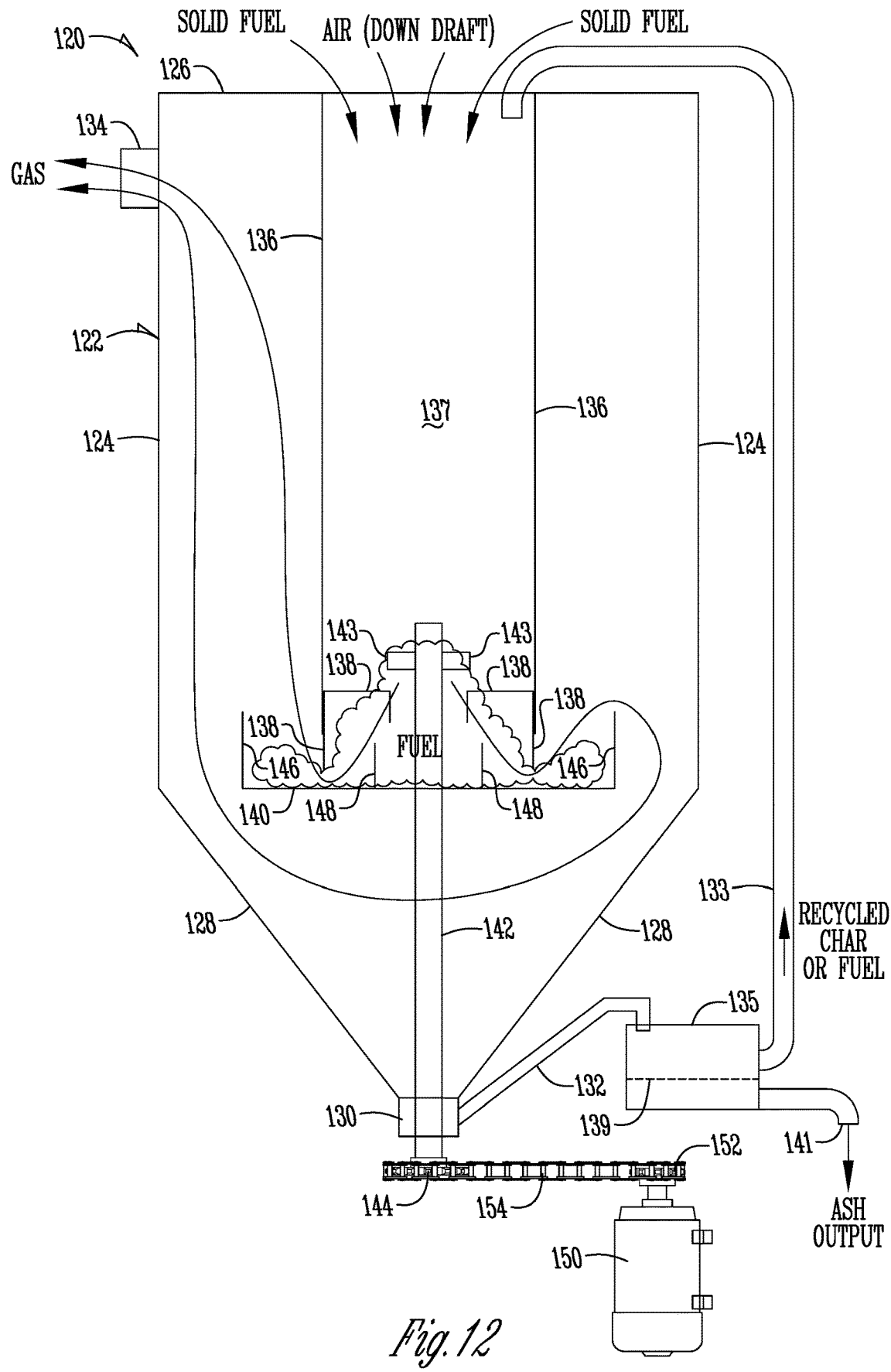
FIG. 12 shows a cut away view of a downdraft rotating bed gasifier, according to some aspects of the present disclosure.

A cut away side view of a first embodiment of a gasifier 120 is shown in FIG. 12. The gasifier 120 includes a gasifier container assembly 122. The gasifier container assembly 122 generally has a cylindrical shaped sidewall 124. However, the sidewall 124 is not limited to a cylindrical shape, as one of ordinary skill in the art will recognize the sidewall 124 can comprise almost any known shape. Connected to the sidewall 124 is a top 126 and a bottom 128. Preferably, the bottom 128 is an inverted cone-shaped piece of metal to allow used ashes and overflow fuel or char to fall to a central point of a char/ash sump 130.

The char/ash sump 130 is preferably connected to a char/ash auger 132 for removing a combination of fuel, char, and/or ash after they have been through the gasification process and fallen to the bottom 128 of the gasifier 120. Char is by far the larger part of this combination, with ash being around 5-10% of the mix. An elevator 133 may take the combination of char, ash, and/or fuel from the char/ash auger 132 and recycle the char or fuel back into the gasifier 120. This allows for the further gasification of the char or fuel and creates a more efficient and more complete gasification of the fuel in the gasifier 120. In addition, less waste ashes have to be removed from the gasifier 120. Therefore, more complete gasification of the fuel is completed. It is to be appreciated that a pneumatic char/ash tube can be substituted for the char/ash auger 132.

The waste ashes can be separated from the char or fuel by an ash separator 135. The ash separator preferably has a screen 139 for separating the waste ashes from the char or fuel which is to be recycled. Once separated, the ashes can be removed through the ash output 141 and the reusable char or fuel can be sent through the elevator 133. It is to be appreciated that char is typically the most desirable product to recycle, however the recycling of other products is not detrimental to the gasification system.

The char created in the process of the present invention generally contains components that are of use in a variety of industries. In some embodiments of the invention, the amount of ash by total weight of the char can be between 2 wt. % and about 20 wt. %, between about 4 wt. % and about 15 wt. %, or between about 7 wt. % and about 10 wt. %; the amount of moisture by total weight of the char can be between 1 wt. % and about 15 wt. %, between about 2 wt. % and about 12 wt. %, or between about 4 wt. % and about 9 wt. %; and the amount of volatile matter by total weight of the char can be between 2 wt. % and about 25 wt. %, between about 4 wt. % and about 20 wt. %, or between about 7 wt. % and about 15 wt. %.

The char itself is made of many components. The components of the char are ultimately determined by what biomass is used. Generally, the char will have carbon and hydrogen. In some embodiments of the invention, the char will have a carbon content of at least about 50 wt. %, preferably at least 55 wt. %, more preferably at least 60 wt. %, and most preferably at least 65 wt. %. In preferred embodiments, the char will include at least carbon, hydrogen, and nitrogen. By recycling char through the gasifier a higher percentage of carbon can be produced.

Thus, it has been found that the process of the present invention creates char which has a high carbon content, preferably a carbon content of at least 50%. This means the char formed as a result of the process disclosed herein can be extracted and used in conjunction with other processes, such as using the char with iron ore to make steel. The gas created by the gasification process in the gasifier 120 can also be extracted from the gasifier 120 through one or more ports 134. The gas can then be used as an energy source for other systems.

Figure 13:
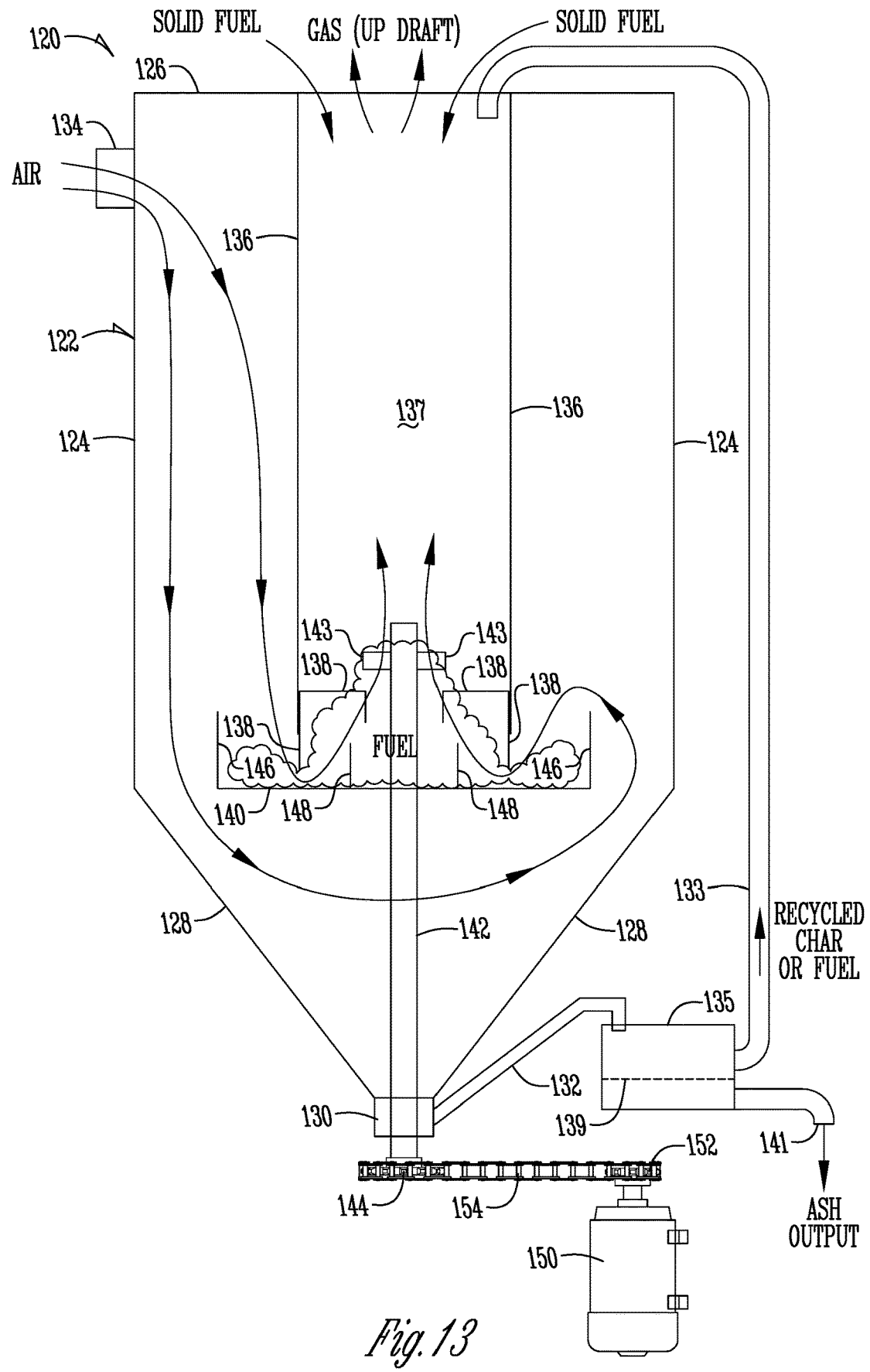
FIG. 13 shows a cut away view of an updraft rotating bed gasifier, according to some aspects of the present disclosure.

FIG. 13 shows the gasifier 120 configured as an updraft gasifier with the air flow reversed. In this embodiment, the air can enter the port 134, pass through the fuel and exit as a gas upward through the fire tube 137. Other aspects of the gasifier 120 remain the same.

More particularly, when a gasifying agent enters the gasifier, the gasifying agent meets the hot ash and the unconverted char in the oxidation zone. As a result, a very hot flue gas consisting of $CO_2$ and $H_2O$ is produced, and it flows upward to the gasification zone where CO and $H_2$ are produced by endothermic reduction reactions. Devolatilization takes place in the area above the gasification zone aided by the residual heat in the flowing gas. Volatiles (including tar precursors) are swept by the gas stream upward. The biomass is then dried and the syngas cooled to a lower temperature. This lower temperature is too low for many of the cracking and reforming reactions of the tar precursors to occur and consequently the gas is produced with a significant amount of tar impurities.

The maximum temperature in updraft gasifiers increases when the feed of air or oxygen increases. Thus, the amount of oxygen feed for the combustion reaction in an updraft gasifier is carefully controlled such that the temperature of the combustion zone does not reach the slagging temperature of the ash, causing operational problems. The gasification temperature may be controlled by mixing steam and/or flue gas with the gasification medium. For an updraft gasifier, the height of the moving bed is generally greater than its diameter to avoid problems with material flow.

Figure 14:
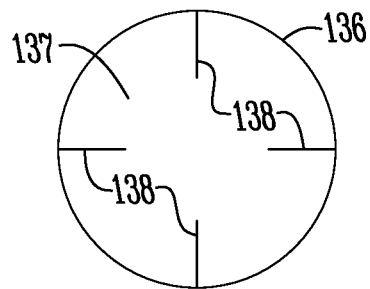
FIG. 14 shows a top view of the vertical shaft shown in FIG. 12, according to some aspects of the present disclosure.

Looking now at FIGS. 12 and 14, the gasifier 120 has a vertical shaft 136 which extends through the gasifier container assembly 122 and creates a fire tube 137. Preferably, the vertical shaft 136 has one or more fingers 138 extending from a lower portion of the vertical shaft 136. The fingers 138 can extend at any angle from the shaft 136. The fingers 138 allow for breaking up the fuel as it falls down and enters the fire tube 137 and during the gasifying process.

Below the vertical shaft 136 is a rotating bed 140 or trough. The rotating bed 140 is attached to a drive shaft 142 which is connected to a sprocket or pulley 144 which is in turn connected to the motor 150 via another sprocket or pulley 152 and a chain or belt 154. There is preferably a bearing (not shown) at the top and the bottom of the drive shaft 142 to facilitate even rotation of the drive shaft 142 and long life. There may also be fingers 143 extending from the drive shaft 142 to aid in mixing the fuel.

The motor 150 is preferably geared down so the drive shaft 142 and the rotating bed 140 rotate inside the gasifier 120 at approximately one revolution every four minutes. The rotating bed 140 allows for the solid fuel which rests on the rotating bed 140 and rotates with the rotating bed 140, thereby creating more distribution of uniform heat within the circumference of the fire tube 137. This is accomplished by moving the hot spots within the solid fuel around inside the fire tube 137 thereby more uniformly heating the inside of the fire tube 137. In addition, the rotating bed 140 can rotate intermittently and/or reverse directions.

Additionally, it is preferred, but not necessary, that the rotating bed 140 have sidewalls 146 to reduce the amount of fuel falling off the rotating bed 140 before the fuel is thoroughly gasified. In other words, the fuel should remain on the rotating bed 140 until the gasified fuel becomes high enough to fall over the sidewalls 146 and down to the ash sump 130. Furthermore, the rotating bed 140 preferably has one or more fingers 148 extending upward from the rotating bed 140 which allow the rotating bed 140 and the fuel to revolve and mix in a crossing path with the fingers 138 extending from the shaft 136. In other words, the fingers

138, 148 pass one another during revolution of the rotating bed 140 and mix the fuel. This aids in more thorough gasification of the fuel.

Figure 15:
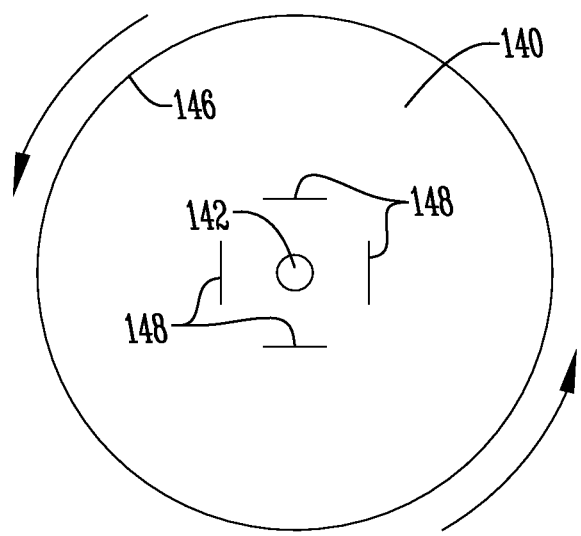
FIG. 15 shows a top view of the rotating trough or bed shown in FIG. 12, according to some aspects of the present disclosure.

As shown in FIG. 15, preferably there are four spaced apart fingers 148 on the rotating bed 140. However, any number of fingers can be used. Preferably, the fingers 148 extend upward at any angle from the rotating bed 140. Additionally, the rotating bed 140 can be made from solid sheet metal, perforated metal, expanded metal, or any other material capable of holding the fuel which is to be gasified. Furthermore, the rotating bed 140 can be alternatively shaped or designed to help facilitate the objectives of the present invention. For example, the rotating bed 140 may include holes. Regardless of whether holes are included in the rotating bed 140, ash will continue to build up in the tray until the ash falls over the side and into the bottom 128 of the gasifier 120 for removal.

Rotation of the rotating bed 140 can comprise any appropriate speed or direction, e.g., the direction of rotation of the rotating bed 140 can be clockwise or counterclockwise. Moreover, the rotating bed 140 can agitate or move intermittently to best accommodate the fuel being used. It is preferred however that the speed of the rotating bed 140 not be so fast as to reduce or impede the gasifying process.

The preferred fuel for this gasifier is uniform and right-sized particles of biomass such as wood chip, wood pellets, shelled corn, and soybeans. However other fuels can be used. Air is sucked (negative pressure) and/or blown (positive pressure) through the fuel which is heated and pyrolyzed, forming gas for the gasification process. The gasification process is self-sustaining with a blower (not shown) operating. The rotating bed 140 replaces the function of a fixed grate in older gasifiers known in the art. The gasification process generally continues until the blower (not shown) or rotating bed 140 stops.

Ring-type rotating trough, which is essentially a tray that has an interior wall as well as an exterior wall, (not shown) can be used in place of the pan-type rotating bed 140 if the rotating tray is to be larger than approximately 36 inches in diameter. This facilitates better fuel agitation, which is necessary to overcome the problems of biomass gasification. Additionally, ring-type troughs increase the rate of gasification by substantially increasing the reactive area in the gasifier 120. Rather than restricting the gas flow to the outside of the ring, a ring-type trough may also allow gas to flow across the inside of the ring. To further reinforce the rigidity of the rotating bed 140, the braces or brackets (not shown) can serve to move char/ash to the ash sump 130 where the char/ash can be augured out by the ash auger 132. The tray can rotate either way and also be set to alternate direction, churning like a washing machine agitator, though much slower.

The recycling of char back into the fire tube 137 uses a natural by-product of biomass gasification. Essentially, the char/ash auger 132 is elevated back to the top of the gasifier 120 and reintroduced/recycled when combined with new solid fuel or biomass fuel being fed into the gasifier 120 for the first time. This greatly reduces the amount of char produced in the process because the char gets reused, thereby reducing the amount of ash over time. It is not typically desirable to recycle ash into the gasifier. Ash can be separated and valuable minerals/metals removed for resale.

In addition to biomass fuel, plastic fuel can be combined with biomass fuel to form a fuel blend. Because the plastic is a petrol-chemical derivative, plastic fuel burns much faster than the biomass fuel. As a result, a filtering effect with the blended fuel can be accomplished by introducing dirty gasses from petrol/fossil fuels which are burned separately in a combustor. Many dirty fuels cannot be blended in this way because of the metallic or other inorganic contents contained within. Excessive metallic/inorganic contents clog the gasifier.

Examples of such dirty fuels are tire fluff, medical waste, and circuit boards. If the plastics/rubber are homogeneous, blending them with biomass in the proper amount allows their clean burning while increasing the energy output from the gasifier. While any type of fuel can be used within the gasifiers of the present invention, it is noted that petrochemical derived fuels cannot easily be gasified by themselves. These fuels melt which in turn restricts the necessary air flow and therefore severely limits or stops the gasification process.

Figure 16:
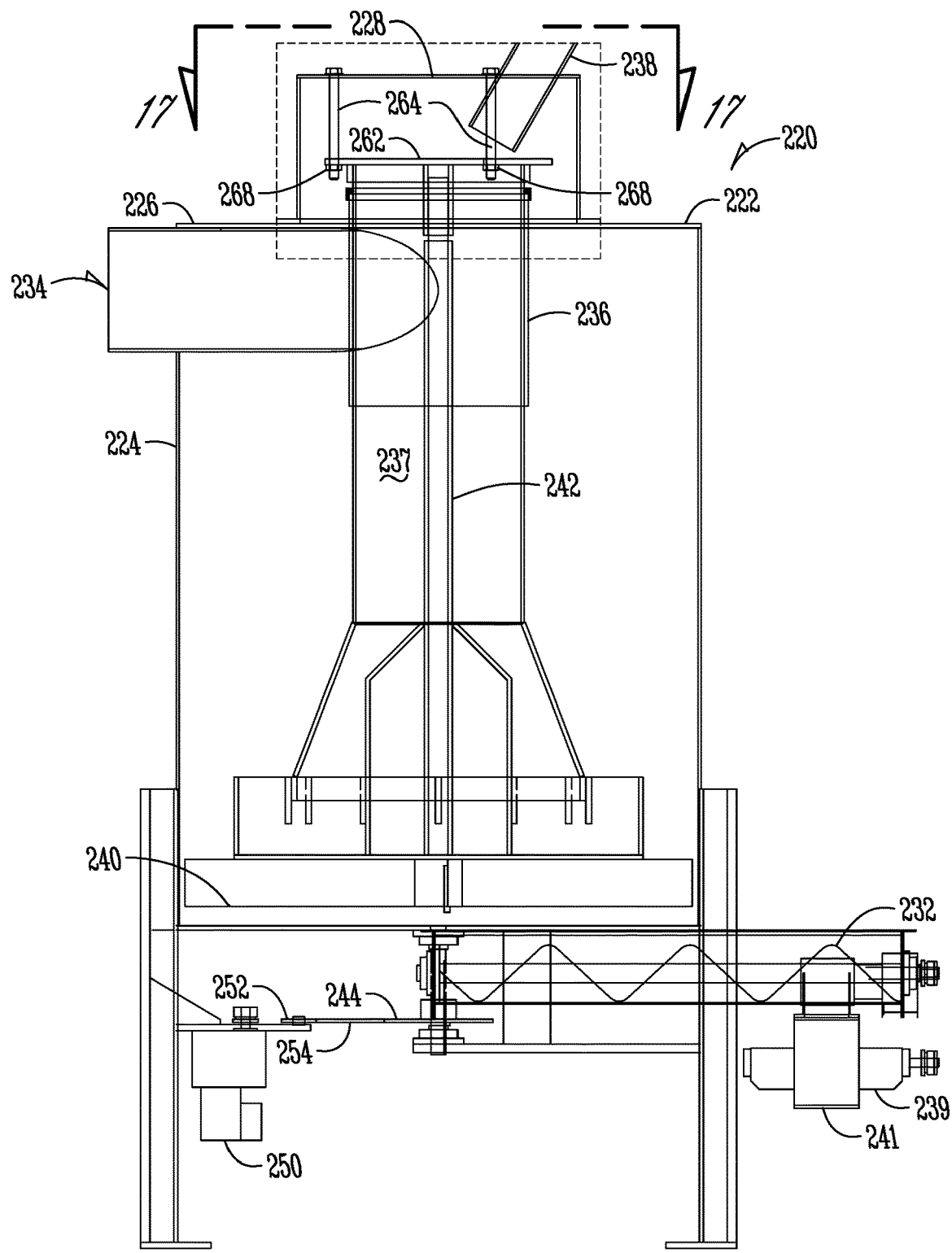
FIG. 16 shows a cutaway view of another embodiment of a rotating bed gasifier with an adjustable fire tube, according to some aspects of the present disclosure.
Figure 17:
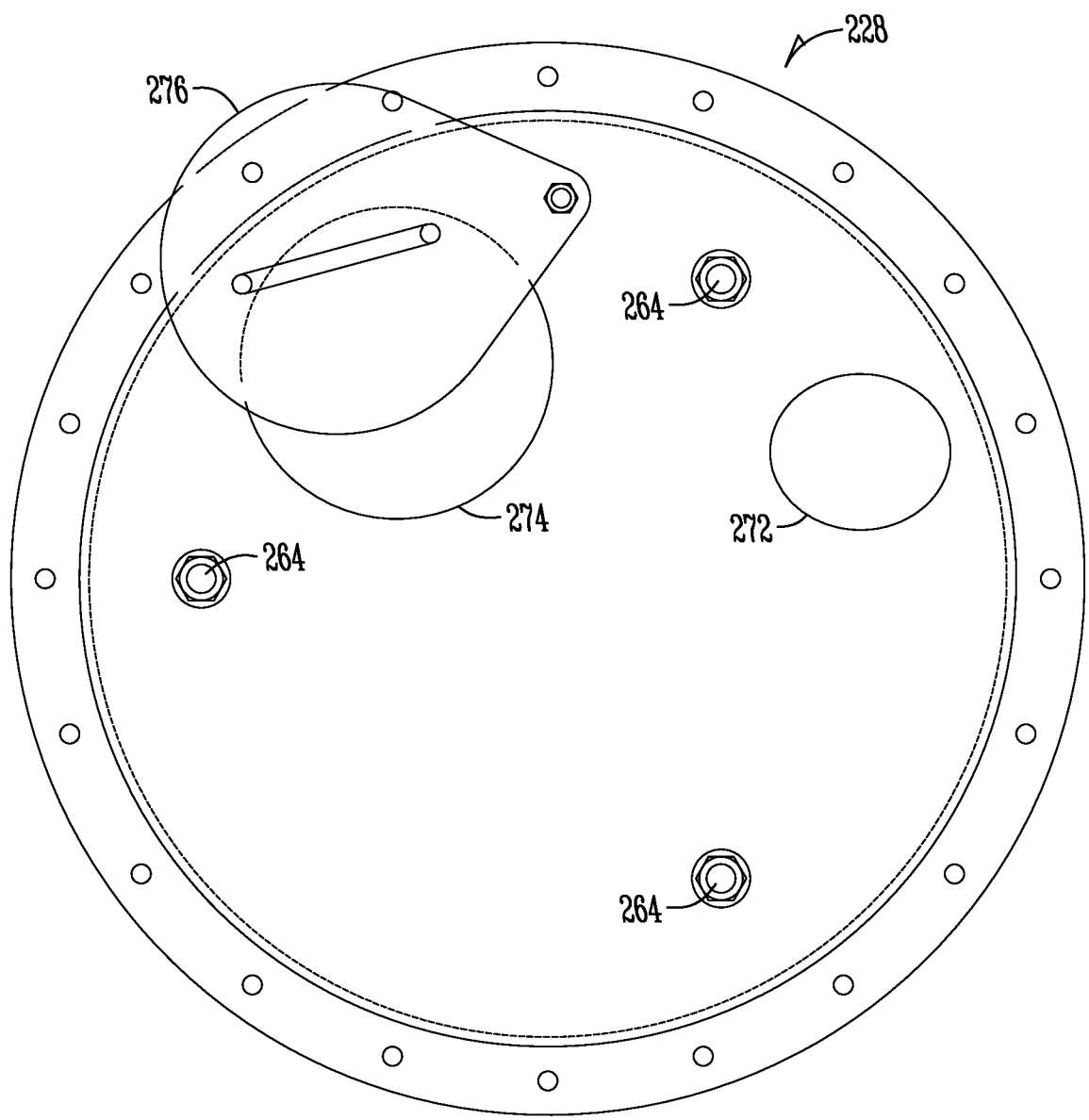
FIG. 17 shows a top view of the gasifier taken along line 17-17, according to some aspects of the present disclosure.
Figure 18:
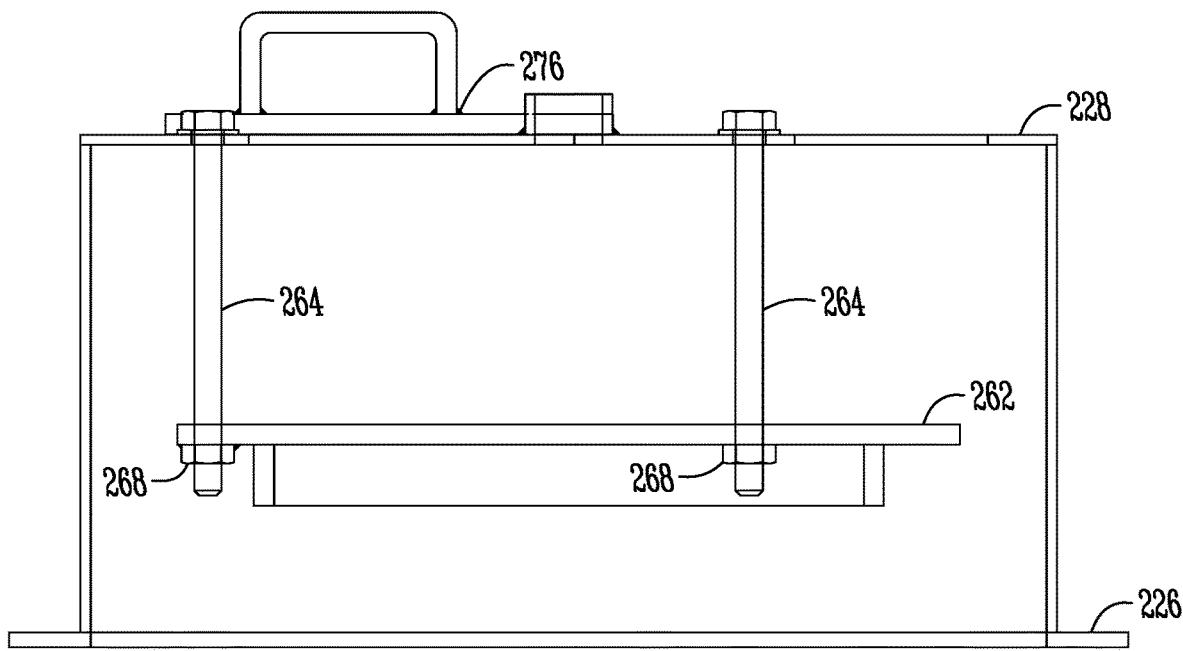
FIG. 18 shows a cutaway of the side of the recess, according to some aspects of the present disclosure.

Another exemplary embodiment of a gasifier 220 is illustrated in FIGS. 16-18. As shown in FIG. 16, the gasifier 220 includes a gasifier container assembly 222 having side walls 224, a top 226, and a recess 228 adjacent the top 226, and one or more ports 234. Within the gasifier container assembly 222 resides the vertical shaft 236 containing the fire tube 237. Beneath the vertical shaft 236 is a rotating bed 240 as previously described. The rotating bed 240 is attached to a drive shaft 242 which is in turn connected to a sprocket 244 which receives power from a motor 250 through a second sprocket 252 and chain 254 or a direct-drive mechanism.

The drive shaft 242 extends from a bearing (not shown) adjacent the sprocket 244 through the rotating bed assembly 240 and the fire tube 237, terminating at the end of the fire tube 237 where it is supported by a drive shaft sleeve 266. The drive shaft sleeve 266 itself is attached to a cap 262 on the top of the shaft 236 which forms the fire tube 237.

FIG. 17 presents a view taken along line 17-17, showing the top of the recess 228. Located on the recess 228 are three holes, a fuel opening 272, and an air opening 274. The air opening 274 is closable by an adjustable cover 276 which can regulate the air flow through the fire tube 237. The fuel opening 272 allows the fuel tube 238 to pass through, thereby delivering new or recycled fuel to the rotating bed 240.

As shown in FIG. 18, three screws 264 pass through the recess 228 and engage the cap 262. The cap 262 has corresponding locations 268 (e.g., weld nuts, tapped holes, threaded posts, or similar structure(s) known in the art) which receive the screws 264 (e.g., threaded rods, internally threaded bars, or other structure(s) complementing the locations 268). The screws 264 are not threaded completely into the locations 268, but rather a space is left between the cap 262 and the top of the recess 228. By adjusting the screws 264, the cap can be raised or lowered as desired. The cap 262 is permanently affixed to the top of the shaft 236. Therefore, as the cap 262 is raised or lowered by adjusting the screws 264, the shaft 236 is raised or lowered relative to the rotating bed 240.

As further shown in FIG. 16, the recess 228 is appropriately sized to accommodate the fire tube 237 as it is raised or lowered. Additionally, the shaft sleeve 266 is sized appropriately so as to remain in continuous contact with the drive shaft 242 which remains fixed as the cap 262 is raised and lowered.

While the current method of raising and lowering the fire tube 237 is described as essentially a manual process, it may be preferable to automate the process, thereby reducing risk to operators and allowing for fully automated control of the gasification process.

As previously described in detail, it is necessary to maintain a consistent fuel flow through the burning fuel in order to achieve optimum combustion. By adjusting the height of the fire tube 237 relative to the rotating bed 240, additional fuel flows to and through the burning fuel. By carefully monitoring the consumption rate of the fuel as well as the amount of unspent fuel discharged, the optimum gap size can be determined.

Figure 19:
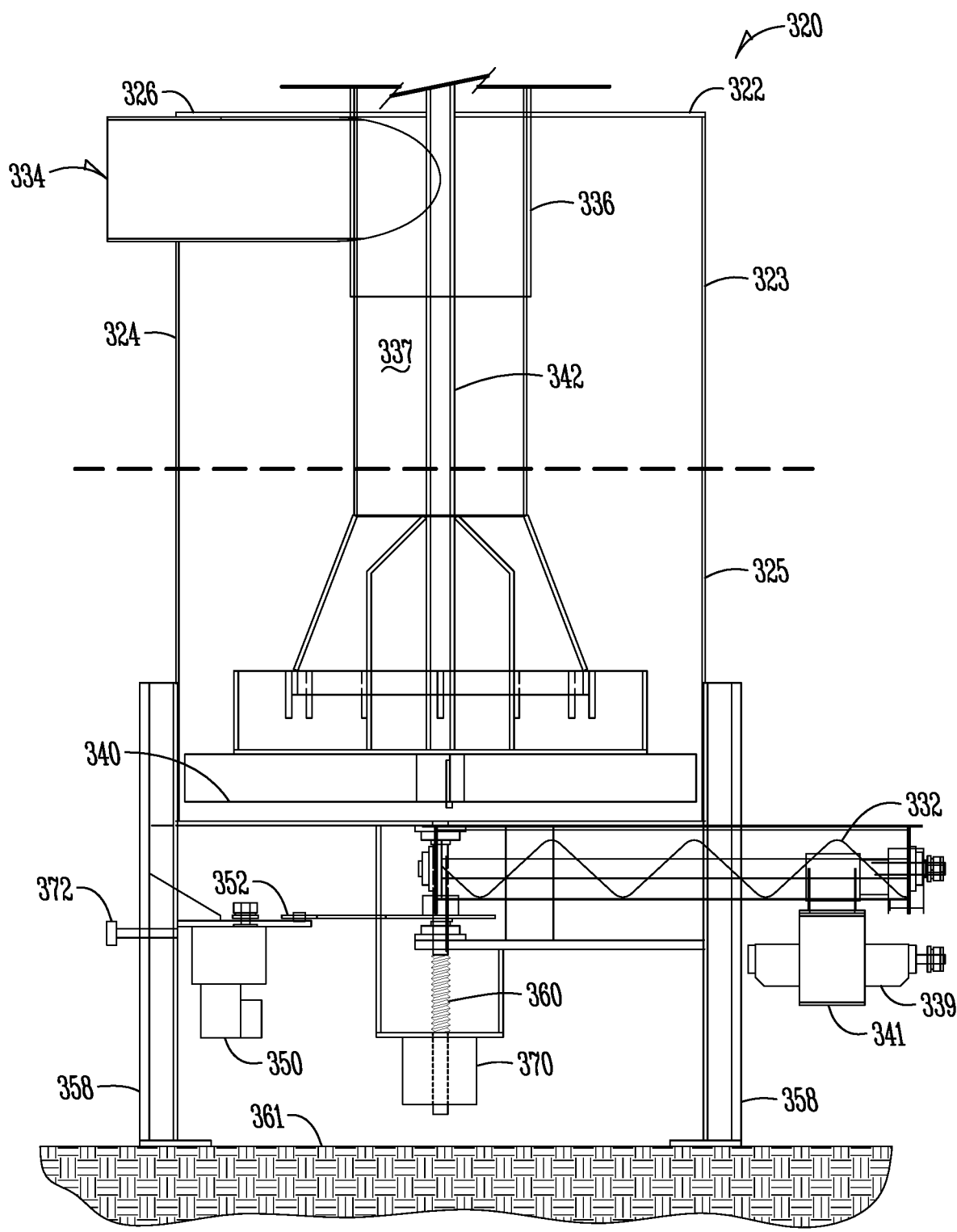
FIG. 19 shows a cutaway view of another embodiment of a gasifier with an adjustable height rotating bed, according to some aspects of the present disclosure.

Yet another exemplary embodiment of a gasifier 320 is illustrated in FIG. 19. The rotating bed 340 of the gasifier 320 is adjustable in height relative to either the fire tube 337 or the enclosure 322, thereby regulating fuel flow to the burning fuel. More particularly, the gasifier 320 has an enclosure 322 with sides 324, a top 326, and one or more ports 334. Within the enclosure 322 is a fire tube 337 extending downwardly from the top 326 to a rotating bed 340. The rotating bed 340 has raised sidewalls which serve to contain fuel, char and ash during the gasification process.

The rotating bed 340 has a drive shaft 342 extending through. The drive shaft 342 is keyed to the rotating bed 340 and a sprocket 344, thereby transferring rotational motion from the sprocket 344 to the rotating bed 340. The sprocket is attached via a chain 354 to a motor 350 and sprocket 352 assembly. Below the sprocket 344 the drive shaft 342 has an external thread 360. This thread 360 extends through an additional motor 370. The additional motor 370 includes, for example, a worm gear which, when activated, adjusts the height of the drive shaft 342 and rotating bed 340. It is also desirable in such a situation to have an adjustable motor mount 372 which may be engaged to adjust the position of the motor 350 to maintain rotation of the rotating bed 340.

According to an alternative embodiment, the enclosure 322 is separated into a top part 323 and an overlapping bottom part 325. Legs 358 support the bottom part 325 while a second support system (such as a scaffolding, legs, ceiling-mounted support, or other commonly known structure) supports the top part 323. The legs 358 are mounted to an elevator built into the floor 361. When it is desirable to adjust the fuel flow to the fuel by adjusting the gap between the fire tube 337 and rotating bed 340, the elevator is raised or lowered. In this manner, fuel flow and burn rate are controlled without requiring sensitive components (such as an electric motor) to be exposed to falling ash and char.

According to an alternative embodiment, the rotating bed 340 has a tube attached to the bottom and surrounding the drive shaft 342. The tube is keyed to the drive shaft 342 along its length so the rotating bed 340 may be adjusted up or downwards as required without needing to adjust the drive shaft 342 and motor 350. The tube may have a thread thereon, corresponding to a worm gear on an additional motor 370.

According to an alternative embodiment, the drive shaft 342 is a telescoping shaft, having one or more shafts located within the drive shaft 342. The shaft forms the piston of a hydraulic or pneumatic piston. As hydraulic or pneumatic pressure is applied, the telescoping shaft extends, thereby raising the floor. The telescoping shaft may then be locked in this position by constant pressure or a mechanical interface, such as a pin, brace, screw, or other commonly known mechanical interface.

According to an alternative embodiment, the rotating bed 340 is attached to drive shaft 342 by a bearing and key, the key transferring rotation from the drive shaft 342 to the rotating bed 340, and the bearing allowing movement of the rotating bed 340 up and down the drive shaft 342. A separate lift is attached to the rotating bed 340 and provides vertical adjustment relative to the floor 361 according to demand. This lift may be a single or series of hydraulic pistons, a worm gear and threaded rod, or other form of lift.

According to an alternative embodiment, the sidewalls of the bed are formed by a continuous tube extending from the floor 361 (or bottom of the enclosure) and overlapping the fire tube. The rotating bed 340 is movable, according to any of the above discussed alternatives, so the height of the sidewalls and gap between the rotating bed 340 and fire tube 337 is adjusted.

Figure 20:
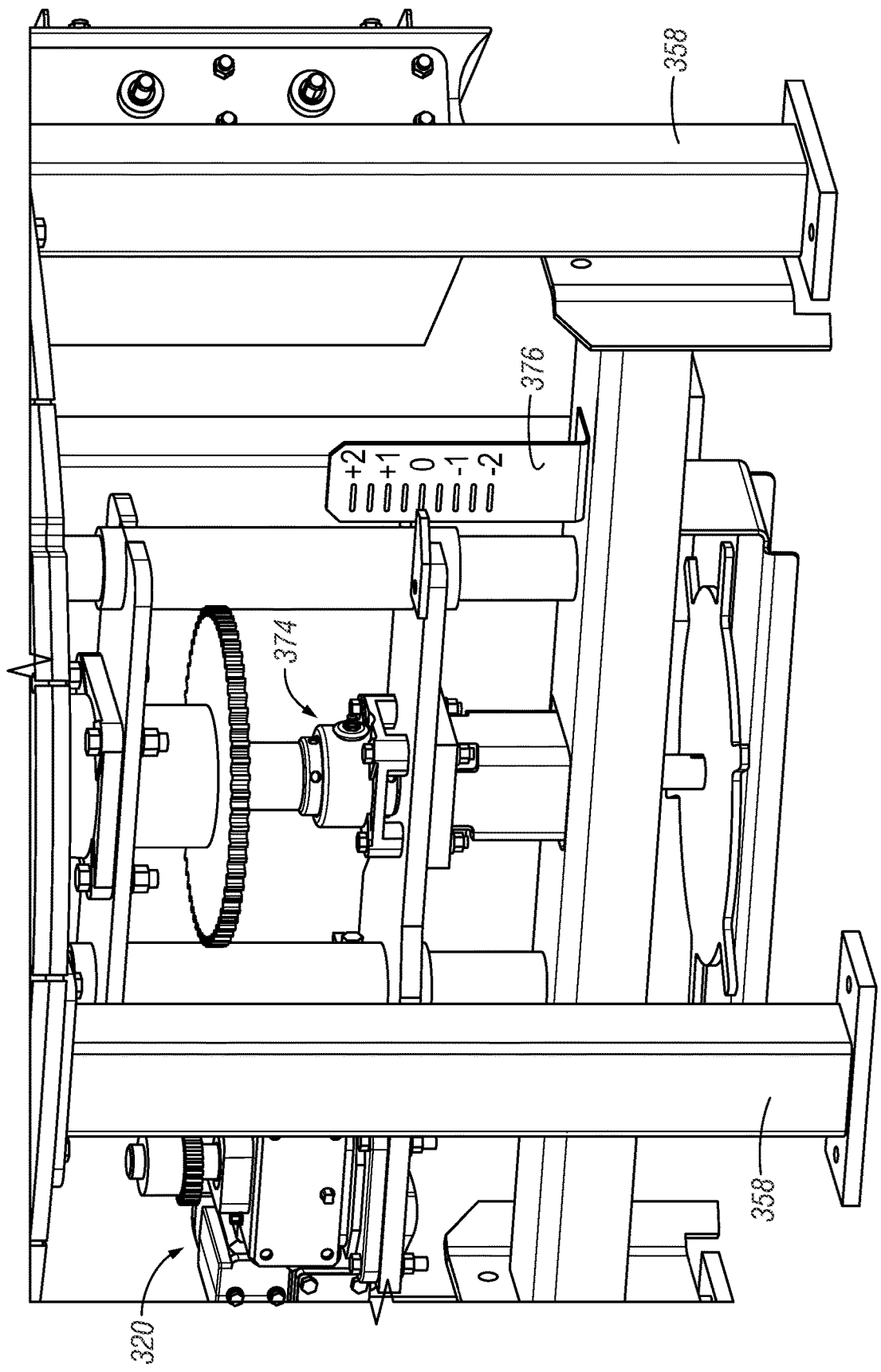
FIG. 20 shows an alternative mechanism for raising and lowering the rotating tray, along with a gauge to measure height above/below the bottom of the firetube, according to some aspects of the present disclosure.

According to yet another alternative embodiment, an alternative mechanism 374 for raising and lowering the rotating tray 340 can be included along with a gauge 376 to measure height above/below the bottom of the firetube, as shown in FIG. 20.

Figure 21:
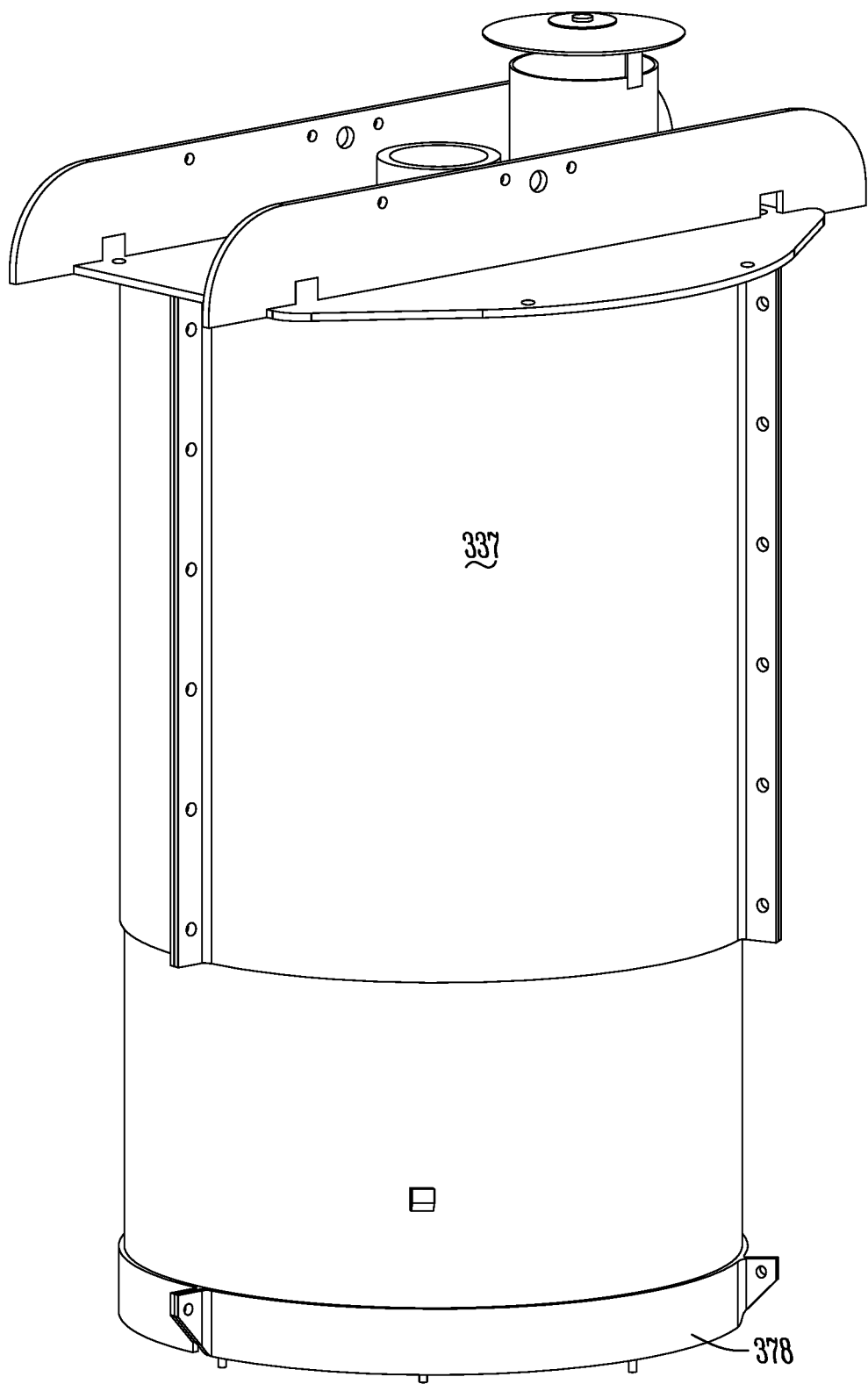
FIG. 21 shows an alternate design or variation to the top of the gasifier design in FIG. 17. More particularly.

According to yet another alternative embodiment shown in FIG. 21, a titanium ring 378 can be included at the bottom of a ceramic/refractory firetube 337 to enhance gasification when a (preferably 2"-thick) refractory is used in the gasifier 320.

In operation, a fuel is selected from a group from which the optimal fuel flow is known. The optimal fuel flow for a given fuel may be determined in a pre-production gasification process as the optimal rate of fuel flow may depend on the density of the fuel and consistency. The fuel is provided to the bed where it is heated and the bed is rotated to provide even heating and agitation throughout the fuel pile. As the fuel is combusted, ash is produced, which builds up with the fuel or char on the bed against the sidewalls. Once the char and ash reach the height of the sidewalls, the material falls to the char and ash collector and the unburnt char is recycled into the fuel source. As the ash builds up, the air passageway between the bed and the shaft is occupied by the char and ash mixture.

At this point, an operator typically needs to monitor the temperature of the burning fuel or char and adjust the height of the floor to increase or decrease fuel flow to the fuel or char. As ash and char builds up about the sidewalls of the floor, the bed may be lowered to increase fuel flow to the burning fuel or char. As efficiency of the system is increased due to increased fuel flow, the ratio of ash to unburnt fuel is increased, which may necessitate raising the bed to maintain fuel flow at a steady rate. The operator may even need to continuously monitor the temperature of the burning fuel or char, amount of ash production, rate of fuel consumption in order to maximize energy captured during the gasification process, and/or change the types and particle size of the fuels.

It is also important to monitor the gas quality and quantity released by the burning fuel or char. Gases such as CO (Carbon Monoxide), $CO_2$ (Carbon Dioxide), H (Hydrogen), any accompanying gas, and oxygen are important gasses which are used to determine both the quality of the useable gas but also the consumption rate of the fuel. In the useable gas produced, high levels of CO and H are desirable, while high levels of oxygen and $CO_2$ are undesirable as indicators of combustion. It is contemplated by the present disclosure that an automated monitoring system may determine the concentration of these gases in the useable gas and adjust the height of the bed or fire tube as necessary.

According to an alternative embodiment, pure oxygen rather than ambient air may be injected into the system in order to produce a higher energy gas output. Other combinations of gasses may also be used without limitation, for example, half ambient air and half pure oxygen. Further combinations are anticipated as being within the scope of this disclosure.

Still other embodiments of the gasifier 20 are contemplated for use with the system 00 of the present disclosure, such as those shown in FIGS. 5-9 and described in U.S. Pat. No. 8,961,626. However, for the sake of brevity, these embodiments are simply incorporated by reference herein.

Any of the above described methods for adjusting the height of the rotating bed relative to the fixed fire tube may also be adapted to adjust the height of the fire tube relative to a fixed bed. The present disclosure contemplates it may even be preferable in some environments to integrate a movable bed with a movable fire tube. On the other hand, while the present disclosure speaks at length about a rotating bed gasifier, it is not the intention of the present disclosure to limit the system 00 to a gasifier 20 having a rotating bed. A fixed, nonrotating bed would be just as well served by the contemplated improvement.

From the foregoing, it can be seen that the present invention accomplishes at least all of the stated objectives.

LIST OF REFERENCE CHARACTERS

The following reference characters and descriptors are not exhaustive, nor limiting, and include reasonable equivalents. If possible, elements identified by a reference character below and/or those elements which are near ubiquitous within the art can replace or supplement any element identified by another reference character.

00 system
20 gasifier
22 combustion tube
24 syn-gas tube
26 heavy duty band clamp (i.e., Marman clamp)
28 syn-gas tube outlet/burner, air intake tube inlet
30 burner
32 burner tube
34 air intake tube
36 adjustment rod
38 adjustment rod supports
40 first mounting plate
42 flange
44 outer through holes
46 inner through holes
48 center
50 second mounting plate
52 flange
54 outer through holes
56 air holes
58 outlet
60 burner, air intake tube outlet/combustion tube inlet
62 fins
64 weld nuts
66 blind holes
68 support block
70 bearing surface
72 column
74 peg
76 male fastener
78 female fastener
80 threads
82 weld nut
84 peg
86 handle
88 mixing plate
90 central aperture
120 gasifier
122 gasifier container assembly
124 sidewalls
126 top
128 bottom
130 char/ash sump
132 char/ash auger
133 elevator
134 port(s)
135 ash separator
136 vertical shaft
137 fire tube
138 finger(s)
139 screen
140 rotating bed
141 ash output
142 drive shaft
143 finger(s)
144 sprocket or pulley
146 sidewalls
148 finger(s)
150 motor
152 sprocket or pulley
154 chain or belt
220 gasifier
222 gasifier container assembly
224 sidewalls
226 top
228 recess
232 ash auger
234 port(s)
236 vertical shaft
237 fire tube
239 ash output
240 rotating bed
241 ash separator
242 drive shaft
244 sprocket
250 motor
252 sprocket
254 chain
262 cap
264 screws
268 locations
272 fuel opening
274 air opening
276 adjustable cover
320 gasifier
322 enclosure
323 top part
324 sides
325 bottom part
326 top
332 ash auger
334 port(s)
336 vertical shaft
337 fire tube
339 ash output
340 rotating bed
341 ash separator
342 drive shaft
350 motor
352 sprocket
358 legs
360 external thread
361 floor
370 additional motor
372 adjustable motor mount
374 alternative mechanism
376 gauge
378 titanium ring

GLOSSARY

Unless defined otherwise, all technical and scientific terms used above have the same meaning as commonly understood by one of ordinary skill in the art to which embodiments of the present invention pertain.

The terms "a," "an," and "the" include both singular and plural referents.

The term "or" is synonymous with "and/or" and means any one member or combination of members of a particular list.

The terms "invention" or "present invention" are not intended to refer to any single embodiment of the particular invention but encompass all possible embodiments as described in the specification and the claims.

The term "about" as used herein refer to slight variations in numerical quantities with respect to any quantifiable variable. Inadvertent error can occur, for example, through use of typical measuring techniques or equipment or from differences in the manufacture, source, or purity of components.

The term "substantially" refers to a great or significant extent. "Substantially" can thus refer to a plurality, majority, and/or a supermajority of said quantifiable variable, given proper context.

The term "generally" encompasses both "about" and "substantially."

The term "configured" describes structure capable of performing a task or adopting a particular configuration. The term "configured" can be used interchangeably with other similar phrases, such as constructed, arranged, adapted, manufactured, and the like.

Terms characterizing sequential order, a position, and/or an orientation are not limiting and are only referenced according to the views presented.

The term "fuel flow" as used herein incorporates several concepts. For example, as fuel is consumed and char and ash are produced, lighter char and ash can be pushed up the sidewalls of a bed. When this combination reaches the height of the sidewalls, the ash and char are forced over the edge to be collected and/or recycled. The fuel consumption rate must therefore conform to the waste disposal rate. If more fuel is added, the consumption rate increases and therefore the disposal rate must also increase. To do so, a bed may be adjusted so that more ash is disposed of from the bed. Additionally, the rate of consumption of the fuel may be further limited due to the insulative properties of the char.

The "scope" of the present invention is defined by the appended claims, along with the full scope of equivalents to which such claims are entitled. The scope of the invention is further qualified as including any possible modification to any of the aspects and/or embodiments disclosed herein which would result in other embodiments, combinations, subcombinations, or the like that would be obvious to those skilled in the art.

What is claimed is:

1. A burner comprising:
    a cylindrical body having a first end, a second end, a circumferential outer surface, an inlet for receiving fuel on the circumferential outer surface, and an outlet for dispensing fuel near the second end;
    an air intake tube concentrically positioned within the cylindrical body, traversing a length of the cylindrical body from the first end to the second end, and having an inlet for receiving ambient air near the first end of the cylindrical body;
    an adjustment rod concentrically positioned within the air intake tube, traversing the length of the cylindrical body from the first end to the second end, and having a mechanism to vary a distance in which the adjustment rod protrudes from the cylindrical body at the first end; and
    a mixing plate attached to the adjustment rod near the second end, the mixing plate adapted to facilitate mixing ambient air and fuel;
    wherein:
        (i) the air intake tube is the only source of air;
        (ii) the ambient air is sucked with negative pressure through the fuel;
        (iii) the fuel is heated and pyrolyzed, forming gas for a gasification process.

2. The burner of claim 1 further comprising adjustment rod supports attached to, and traversing a radial distance between, the air intake tube and the adjustment rod.

3. The burner of claim 2 wherein the adjustment rod supports are placed in an upright position such that a load caused by a gravitational force acting on the adjustment rod travels through a longitudinal axis of the adjustment rod supports.

4. The burner of claim 2 wherein the adjustment rod supports comprise a support block having a curved bearing surface which matingly engages an outer surface of the adjustment rod.

5. The burner claim 2 wherein the adjustment rod supports comprise a peg which secure to a blind hole in the intake tube.

6. The burner of claim 1 further comprising mixing fins arrayed about a circumferential outer surface of the air intake tube to further facilitate mixing ambient air and fuel.

7. The burner of claim 1 wherein the mechanism comprises threads and rotating the adjustment rod varies the distance in which the adjustment rod protrudes from the cylindrical body at the first end.

8. The burner of claim 1 wherein the adjustment rod comprises a peg at one end, said peg secured to a handle which allows for rotation of the adjustment rod.

9. The burner of claim 1 further comprising mounting plates at the first end and the second end.

10. The burner of claim 9 wherein the mounting plates comprise a flange and through holes to facilitate mounting the burner in a fixed position.

11. The burner of claim 10 further comprising male and female fasteners which secure to one another through the through holes.

12. The burner of claim 10 further comprising air holes in the mounting plate at the second end.

13. The burner of claim 10 wherein the mounting plates positioned about a central axis common to the cylindrical body, the air intake tube, and the adjustment rod.

14. A combustion system comprising:
    a gasifier;
    the burner of claim 1, said burner adapted to receive a gasified biomass fuel from the gasifier;
    a combustor adapted to burn dirty fuels and to receive a mixture of ambient air and a gasified biomass fuel from the burner.

15. The combustion system of claim 14 further comprising a syn-gas tube fluidly connecting the gasifier to the burner.

16. The combustion system of claim 14 wherein the gasifier is a downdraft gasifier.

17. The combustion system of claim 14 wherein the gasifier is an updraft gasifier.

18. A method of combustion comprising:
receiving gaseous fuel at an inlet of a burner tube;
receiving ambient air at an inlet of an air intake tube, said air intake tube concentrically positioned within the burner tube;
adjusting a distance in which a rod protrudes from the burner tube at one end to adjust a position of a mixing plate operatively attached to the burner tube at the other end;
mixing the fuel and the ambient air, at least in part, with the mixing plate to form a more efficient mixture of resulting gas and air; and
igniting the resulting mixture of gas and air to burn more efficiently;
wherein:
   (i) the air intake tube is the only source of air; and
   (ii) the ambient air is sucked with negative pressure through the fuel;
   (iii) the fuel is heated and pyrolyzed, forming gas for a gasification process.

19. The method of claim 18 further comprising selecting the fuel from a group consisting of organic- and fossil fuel-based carbonaceous materials.

20. The method of claim 18 further comprising inserting the fuel through a fire tube and onto a bed of a gasifier, supplying heat and air to the fuel, and stirring or agitating the fuel to promote uniform gasification of the fuel.

\* \* \* \* \*